(12) United States Patent
Ahn et al.

(10) Patent No.: US 8,830,437 B2
(45) Date of Patent: Sep. 9, 2014

(54) METHOD OF FABRICATING LIQUID CRYSTAL DISPLAY OF HORIZONTAL ELECTRONIC FIELD APPLYING TYPE

(71) Applicant: LG Display Co., Ltd., Seoul (KR)

(72) Inventors: Byung Chul Ahn, Kyounggi-do (KR); Youn Gyoung Chang, Kyounggi-do (KR); Heung Lyul Cho, Kyounggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/933,837

(22) Filed: Jul. 2, 2013

(65) Prior Publication Data

US 2013/0295701 A1    Nov. 7, 2013

Related U.S. Application Data

(62) Division of application No. 10/962,461, filed on Oct. 13, 2004, now Pat. No. 8,502,944.

(30) Foreign Application Priority Data

Nov. 4, 2003   (KR) .................. 10-2003-0077658

(51) Int. Cl.
*G02F 1/1345*   (2006.01)
*G02F 1/1343*   (2006.01)
*G02F 1/1333*   (2006.01)
*G02F 1/1362*   (2006.01)

(52) U.S. Cl.
CPC ........ *G02F 1/1333* (2013.01); *G02F 1/134363* (2013.01); *G02F 1/13458* (2013.01); *G02F 1/136227* (2013.01)

USPC ........... 349/152; 349/149; 349/151; 345/104; 345/90

(58) Field of Classification Search
USPC ............................. 349/42–43, 141, 149–152
See application file for complete search history.

(56) References Cited

U.S. PATENT DOCUMENTS

| | | | |
|---|---|---|---|
| 5,886,762 A | 3/1999 | Lee et al. | |
| 5,914,762 A | 6/1999 | Lee et al. | |
| 6,022,753 A | 2/2000 | Park et al. | |
| 6,208,399 B1 | 3/2001 | Ohta et al. | |
| 6,215,541 B1 | 4/2001 | Song et al. | |
| 6,433,764 B1 | 8/2002 | Hebiguchi et al. | |
| 7,206,051 B2 * | 4/2007 | Lee et al. | 349/141 |
| 2002/0160555 A1 * | 10/2002 | Hong et al. | 438/158 |
| 2003/0090604 A1 * | 5/2003 | Song et al. | 349/56 |
| 2003/0122990 A1 | 7/2003 | Kim | |
| 2004/0129943 A1 | 7/2004 | Yoo et al. | |

FOREIGN PATENT DOCUMENTS

| | | |
|---|---|---|
| CN | 1251914 | 5/2000 |
| JP | H12-111958 | 4/2000 |
| JP | 2002-98995 | 4/2002 |
| KR | 2000-33515 | 6/2000 |

* cited by examiner

*Primary Examiner* — Hoan C Nguyen
(74) *Attorney, Agent, or Firm* — McKenna Long & Aldridge LLP

(57) ABSTRACT

A liquid crystal display (LCD) device of a horizontal electric field type is disclosed. The LCD device is fabricated by a three-mask process, and has gate pad, common pad and data pad electrodes, each including a upper electrode formed of a transparent conductive material. With a lift-off process, these upper electrodes are formed within contact holes.

19 Claims, 24 Drawing Sheets

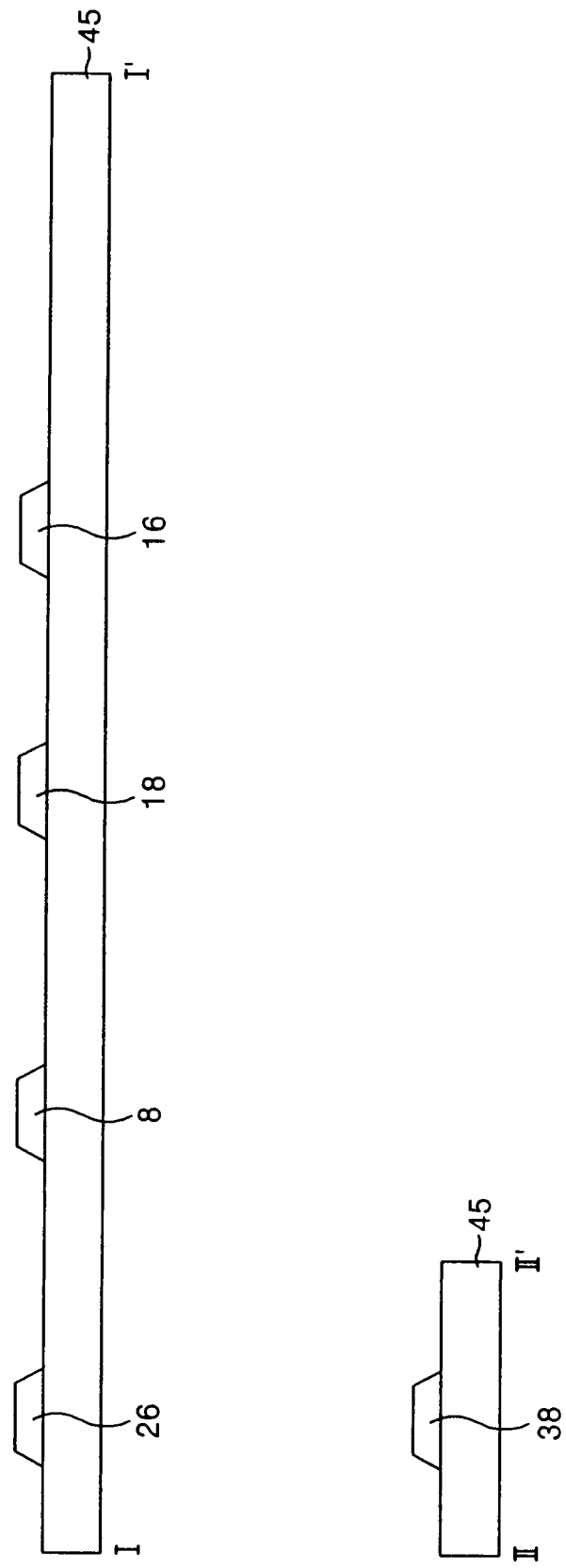

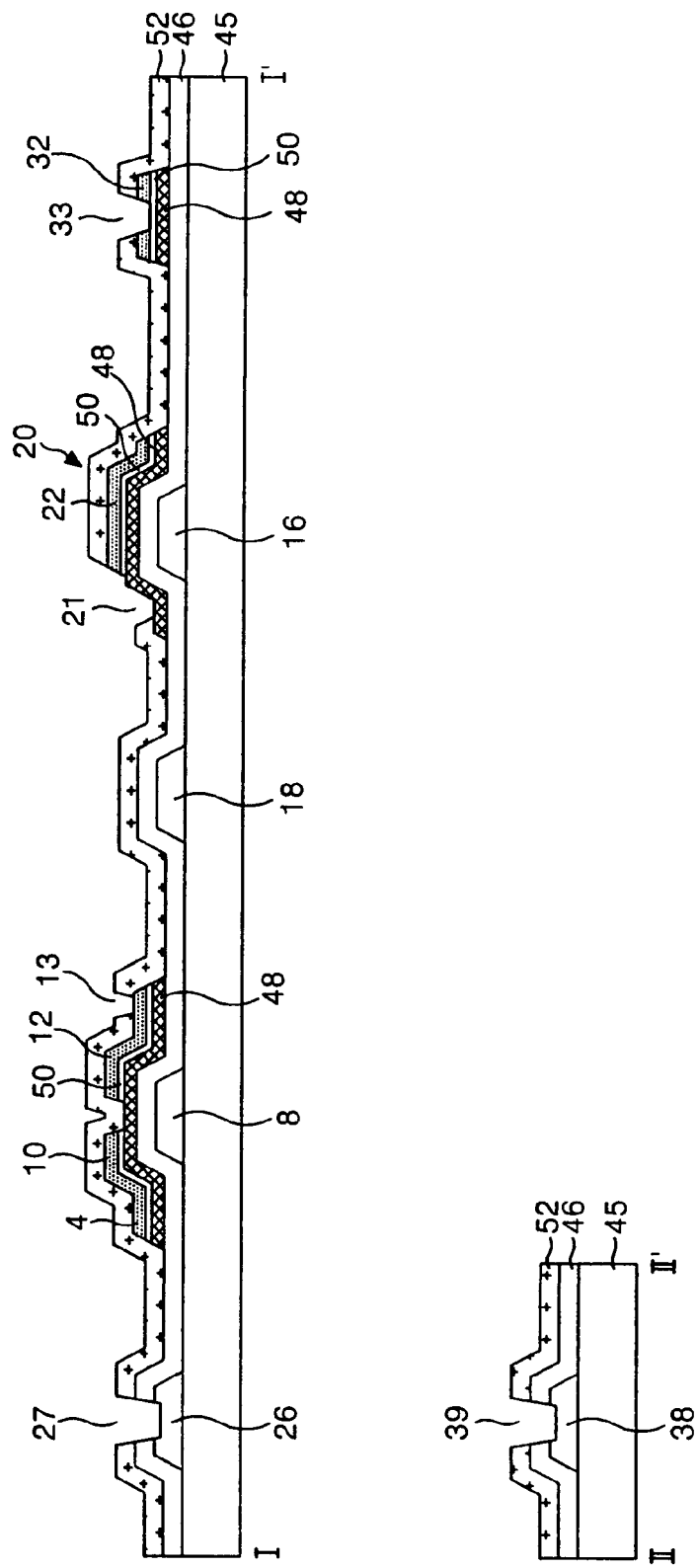

METHOD OF FABRICATING LIQUID CRYSTAL DISPLAY OF HORIZONTAL ELECTRONIC FIELD APPLYING TYPE

CROSS-REFERENCE TO RELATED APPLICATIONS

This application is a Divisional of application Ser. No. 10/962,461 filed Oct. 13, 2004, now allowed, which claims priority to Korean Patent Application No. 10-2003-77658, filed Nov. 4, 2003, all of which are hereby incorporated by reference for all purposes as if fully set forth herein.

BACKGROUND OF THE INVENTION

1. Field of the Invention

The present invention relates to a liquid crystal display, and more particularly to a thin film transistor substrate of a horizontal electric field type and a fabricating method thereof that can reduce the number of mask processes.

2. Discussion of the Related Art

Generally, liquid crystal displays (LCDs) control the light transmittance of liquid crystal using an electric field to display pictures. LCDs are largely classified into a vertical electric field type and a horizontal electric field type, depending upon the direction of the electric field driving the liquid crystal.

An LCD of the vertical electric field type drives a liquid crystal in a twisted nematic (TN) mode with a vertical electric field formed between a pixel electrode on a lower substrate and a common electrode on a upper substrate, with the pixel and common electrodes facing each other. Such an LCD of the vertical electric field type has an advantage of a high aperture ratio, while having a drawback of a narrow viewing angle of about 90°. An LCD of the horizontal electric field type drives a liquid crystal in an in plane switch (IPS) mode with a horizontal electric field between a pixel electrode and a common electrode on a lower substrate, which are arranged in parallel to each other. Such an LCD of the horizontal electric field type has an advantage of a wide viewing angle of about 160°.

Hereinafter, an LCD of the horizontal electric field type will be described in detail. An LCD of a horizontal electric field type includes a thin film transistor substrate (i.e., a lower substrate) and a color filter substrate (i.e., an upper substrate) attached to and facing each other. The LCD further includes a spacer for uniformly maintaining a cell gap between the two substrates and a liquid crystal filled into the cell gap. The thin film transistor substrate includes a plurality of signal wirings for forming a horizontal electric field for each pixel, a plurality of thin film transistors, and an alignment film coated thereon to align the liquid crystal. The color filter substrate includes a color filter for implementing a color, a black matrix for preventing a light leakage and an alignment film coated thereon to align the liquid crystal.

In such a liquid crystal display, completing the thin film transistor substrate requires a complicated fabrication process with several mask processes, leading to an increased manufacturing cost. In order to solve this problem, active researches are in progress to reduce the number of the mask processes in completing the thin film transistor substrate. This is because one mask process includes many sub-processes such as thin film deposition, cleaning, photolithography, etching, photo-resist stripping and inspection processes, etc. Recently, a four-mask process has been developed. This four-mask process reduces one mask process from the existent five-mask process that was a standard mask process in manufacturing the thin film transistor substrate.

FIG. 1 is a plan view illustrating a structure of a thin film transistor substrate of a horizontal electric type fabricated by a four-mask process according to a related art, and FIG. 2 is sectional views of the thin film transistor substrate taken along the lines I-I' and II-II' in FIG. 1.

Referring to FIG. 1 and FIG. 2, the thin film transistor substrate includes a gate line 2 and a data line 4 provided on a lower substrate 45 in such a manner to cross each other with a gate insulating film 46 therebetween, a thin film transistor 6 provided near each crossing, a pixel electrode 14 and a common electrode 18 provided at a pixel area defined by the gate line 2 and the data line 4 for forming a horizontal electric field, and a common line 16 connected to the common electrode 18. Further, the thin film transistor substrate includes a storage capacitor 20 provided at an overlapping portion between the pixel electrode 14 and the common line 16, a gate pad 24 connected to the gate line 2, and a data pad 30 connected to the data line 4 and a common pad 36 connected to the common line 16. The gate line 2 supplied with a gate signal and the data line 4 supplied with a data signal define the pixel area, with the gate insulating film therebetween 46. The common line 16 supplied with a reference voltage for driving the liquid crystal is provided in parallel to the gate line 2 within the pixel area.

The thin film transistor 6 charges the data signal of the data line 4 to the pixel electrode 14 in response to the gate signal of the gate line 2. To this end, the thin film transistor 6 includes a gate electrode 8 connected to the gate line 2, a source electrode 10 connected to the data line 4, and a drain electrode 12 connected to the pixel electrode 14. The thin film transistor 6 further includes an active layer 48 overlapping the gate electrode 8 with a gate insulating film 46 therebetween to define a channel between the source electrode 10 and the drain electrode 12. The active layer 48 also overlaps the data line 4, a lower data pad electrode 32 and an upper storage electrode 22. On the active layer 48 is an ohmic contact layer 50 to form an ohmic contact with the data line 4, the source electrode 10, the drain electrode 12, and the lower data pad electrode 32.

The pixel electrode 14 is connected to the drain electrode 12 of the thin film transistor 6 via a first contact hole 13 passing through a protective film 52, and is provided at the pixel area. More specifically, the pixel electrode 14 includes a first horizontal part 14A connected to the drain electrode 12 and provided in parallel with adjacent gate lines 2, a second horizontal part 14B overlapping the common line 16, and a finger part 14C provided in parallel between the first and second horizontal parts 14A and 14B. The common electrode 18 is connected to the common line 16 and is provided at the pixel area. More specially, the common electrode 18 is provided in parallel with the finger part 14C of the pixel electrode 14 at the pixel area.

Accordingly, a horizontal electric field is formed between the pixel electrode 14 to which a data signal is applied via the thin film transistor 6 and the common electrode 18 to which a reference voltage is applied via the common line 16. More specifically, a horizontal electric field is formed between the finger part 14C of the pixel electrode 14 and the common electrode 18. Liquid crystal molecules arranged in a horizontal direction between the thin film transistor substrate and the color filter substrate rotate by such a horizontal electric field due to a dielectric anisotropy of the liquid crystal molecules. Transmittance of the pixel area is differentiated depending upon an extent of the rotation of the liquid crystal molecules, thereby implementing gray scale levels.

The storage capacitor 20 is constructed with the common line 16, an upper storage electrode 22 overlapping the common line 16, the gate insulating film 46, the active layer 48 and the ohmic contact layer 50, as shown in FIG. 2. The gate insulating film 46, the active layer 48 and the ohmic contact layer 50 are sandwiched between the common line 16 and the upper storage electrode 22. In the storage capacitor 20, the pixel electrode 14 is connected to the upper storage electrode 22 via a second contact hole 21 passing through the protective film 52. The storage capacitor 20 maintains a data signal charged in the pixel electrode 14 until the next data signal is charged.

The gate line 2 is connected to a gate driver (not shown) via the gate pad 24. The gate pad 24 is constructed with a lower gate pad electrode 26 extended from the gate line 2, and an upper gate pad electrode 28 connected to the lower gate pad electrode 26 via a third contact hole 27 passing through the gate insulating film 46 and the protective film 52. The data line 4 is connected to the data driver (not shown) via the data pad 30. The data pad 30 is constructed with a lower data pad electrode 32 extended from the data line 4, and an upper data pad electrode 34 connected to the lower data pad electrode 32 via a fourth contact hole 33 passing through the protective film 52. The common line 16 receives a reference voltage from an external reference voltage source (not shown) through the common pad 36. The common pad 36 is constructed with a lower common pad electrode 38 extended from the common line 16, and an upper common pad electrode 40 connected to the lower common pad electrode 38 via a fifth contact hole 39 passing through the gate insulating film 46 and the protective film 52.

A method of fabricating the thin film transistor substrate having the above-mentioned structure by a four-mask process will be described in detail with reference to FIGS. 3A to 3D.

Referring to FIG. 3A, a gate metal pattern group (or a first conductive pattern group) including the gate line 2, the gate electrode 8 and the lower gate pad electrode 26, the common line 16, the common electrode 18 and the lower common pad electrode 38 is provided on the lower substrate 45 by a first mask process. More specifically, a gate metal layer (or a first conductive layer) is formed on the lower substrate 45 by a deposition technique such as sputtering. Then, the gate metal layer is patterned by photolithography and etching processes using a first mask to thereby form the gate metal pattern group including the gate line 2, the gate electrode 8, the lower gate pad electrode 26, the common line 16, common electrode 18 and the lower common pad electrode 38. Herein, the gate metal layer is formed of metal such as aluminum-group metal, chrome (Cr) or molybdenum (Mo).

Referring to FIG. 3B, the gate insulating film 46 is deposited onto the lower substrate 45 provided with the gate metal pattern group. Further, a semiconductor pattern including the active layer 48 and the ohmic contact layer 50 and a source/drain metal pattern group (or a second conductive pattern group) including the data line 4, the source electrode 10, the drain electrode 12, the lower data pad electrode 32 and the upper storage electrode 22 are formed on the gate insulating film 46 by a second mask process. More specifically, the gate insulating film 46, an amorphous silicon layer, an n+ amorphous silicon layer and a source/drain metal layer (or a second conductive layer) are sequentially deposited on the lower substrate 45 provided with the gate metal pattern group by such deposition techniques as plasma enhanced chemical vapor deposition (PECVD) and sputtering, etc. Herein, the gate insulating film 46 is formed of an inorganic insulating material such as silicon nitride ($SiN_x$) or silicon oxide ($SiO_x$). The source/drain metal layer is formed of molybdenum (Mo), titanium (Ti), tantalum (Ta) or molybdenum alloy, etc.

Then, a photo-resist pattern is formed on the source/drain metal layer by a photolithography process using a second mask. In this case, a diffractive exposure mask having a diffractive exposing part at a channel portion of the thin film transistor is used as a second mask, thereby allowing the photo-resist pattern at the channel portion to have a lower height than other source/drain pattern portions. Subsequently, the source/drain metal layer is patterned by a wet-etching process using the photo-resist pattern to thereby form the source/drain metal pattern group including the data line 4, the source electrode 10, the drain electrode 12 which is integral to the source electrode 10 and the upper storage electrode 22.

Next, the n+ amorphous silicon layer and the amorphous silicon layer are patterned at the same time by a dry-etching process using the same photo-resist pattern to thereby form the ohmic contact layer 50 and the active layer 48. The photo-resist pattern having a relatively low height at the channel portion is removed by an ashing process, and thereafter the source/drain metal pattern and the ohmic contact layer 50 at the channel portion are etched by a dry-etching process. Thus, the active layer 48 of the channel portion is exposed to disconnect the source electrode 10 from the drain electrode 12. Then, the photo-resist pattern left on the source/drain metal pattern group is removed by a stripping process.

Referring to FIG. 3C, the protective film 52 including the first to fifth contact holes 13, 21, 27, 33 and 39 are formed on the gate insulating film 46 provided with the source/drain metal pattern group by a third mask process. More specifically, the protective film 52 is entirely deposited on the gate insulating film 46 provided with the source/drain metal pattern group by a deposition technique such as plasma enhanced chemical vapor deposition (PECVD). The protective film 52 is patterned by photolithography and etching processes using a third mask to thereby define the first to fifth contact holes 13, 21, 27, 33 and 39. The first contact hole 13 passes through the protective film 52 to expose the drain electrode 12, whereas the second contact hole 21 passes through the protective film 52 to expose the upper storage electrode 22. The third contact hole 27 passes through the protective film 52 and the gate insulating film 46 to expose the lower gate pad electrode 26. The fourth contact hole 32 passes through the protective film 52 to expose the lower data pad electrode 32. The fifth contact hole 30 passes through the protective film 52 and the gate insulating film 48 to expose the lower common pad electrode 38. Herein, when the source/drain metal layer is formed of a metal material having a large dry-etching ratio such as molybdenum (Mo), then each of the first, second and fourth contact holes 13, 21 and 33 passes through the drain electrode 12, the upper storage electrode 22 and the lower data pad electrode 32 to thereby expose the side surfaces thereof. The protective film 50 is formed of an inorganic material identical to the gate insulating film 46, or an organic material having a small dielectric constant such as an acrylic organic compound, BCB (benzocyclobutene) or PFCB (perfluorocyclobutane), etc.

Referring to FIG. 3D, a transparent conductive film pattern group (or a third conductive pattern group) including the pixel electrode 14, the upper gate pad electrode 28, the upper data pad electrode 34 and the upper common pad electrode 40 are formed on the protective film 52 by a fourth mask process. More specifically, a transparent conductive film (or a third conductive layer) is deposited onto the protective film 52 by a deposition technique such as sputtering, etc. Then, the transparent conductive film is patterned by photolithography and etching processes using a fourth mask to thereby provide the transparent conductive pattern group including the pixel electrode 14, the upper gate pad electrode 28, the upper data pad electrode 34 and the upper common pad electrode 40. The pixel electrode 14 is electrically connected to the drain electrode 12 via the first contact hole 13, and is also electrically connected to the upper storage electrode 22 via the second contact hole 21. The upper gate pad electrode 28 is electrically connected to the lower gate pad electrode 26 via the third contact hole 37. The upper data pad electrode 34 is electrically connected to the lower data pad electrode 32 via the fourth contact hole 33. The upper common pad electrode 40 is electrically connected to the lower common pad electrode 38 via the fifth contact hole 39. Herein, the transparent conductive film is formed of indium-tin-oxide (ITO), tin-oxide (TO) or indium-zinc-oxide (IZO), or the like.

The thin film transistor substrate of a horizontal electric field type and the fabricating method thereof as described above employs a four-mask process, thereby reducing the number of fabricating processes and reducing the manufacturing cost in comparison with such thin film transistor substrates fabricated by a five-mask process. However, because such a four-mask process still requires a complicate fabricating process and has a limit in cost reduction, a more simplified fabricating process would be beneficial to reduce the manufacturing cost.

SUMMARY OF THE INVENTION

Accordingly, the present invention is directed to an LCD and fabricating method thereof that substantially obviate one or more of the problems due to limitations and disadvantages of the related art.

Accordingly, it is an advantage of the present invention to provide a thin film transistor substrate of horizontal electric field type and a fabricating method thereof that can reduce the number of mask processes.

Another advantage of the present invention is to provide a thin film transistor substrate of horizontal electric field type and a fabricating method thereof that have a stripper penetration path on a signal line to facilitate a lift-off process Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an liquid crystal display (LCD) of a horizontal electric field type having a liquid crystal between upper and lower substrates includes a gate line and a common line formed from a first conductive layer on the lower substrate; a data line crossing the gate line with a gate insulating film therebetween formed from a second conductive layer, the gate and data lines defining a pixel area; a thin film transistor connected to the gate and data lines; a common electrode extended from the common line into the pixel area and formed from the first conductive layer; a pixel electrode electrically connected to a drain electrode of the thin film transistor and formed from the second conductive layer in the pixel area, the pixel electrode and the common electrode in the pixel area forming a horizontal electric field during an operation of the LCD; a protective film for covering at least the thin film transistor; a gate pad having a lower gate pad electrode extended from the gate line, a upper gate pad electrode formed from a third conductive layer and a first contact hole, the upper gate pad electrode electrically connected to the lower gate pad electrode via the first contact hole; a common pad having a lower common pad electrode connected to the common line, a upper common pad electrode formed from the third conductive layer and a second contact hole, the upper common pad electrode electrically connected to the lower common pad electrode via the second contact hole; and a data pad having a lower data pad electrode connected to the data line, a upper data pad electrode formed from the third conductive layer and a third contact hole, the upper data pad electrode electrically connected to the lower data pad electrode through the third contact hole, wherein the upper gate pad, upper common pad and upper data pad electrodes are formed within the first to third contact holes, respectively.

A stripper penetration path is formed on at least one of the gate line, the data line, the common line, the pixel electrode and the common electrode in the pixel area.

The stripper penetration path is formed either in the protective film or in the protective film and the gate insulating film to easily remove a photo-resist pattern used for the patterning of the protective film during a lift-off process.

The stripper penetration path is formed to have a shape of a slit or a plurality of holes.

The stripper penetration path is formed at the same time as the first to third contact holes.

A dummy pattern formed from said third conductive layer is left within the stripper penetration path.

The LCD further includes a storage capacitor having first and second lower storage electrodes formed from the first conductive layer; and a upper storage electrode formed from the second conductive layer, the upper storage capacitor electrode electrically connected to the pixel electrode.

Herein, the upper storage electrode is integral to any one of fingers of the pixel electrode.

In another aspect of the present invention, a method of fabricating an LCD of a horizontal electric field type having a liquid crystal between lower and upper substrates includes forming a first conductive pattern group including a gate line, a gate electrode connected to the gate line, a lower gate pad electrode, a common line, a common electrode extended from the common line, a lower common pad electrode connected to the common line on the lower substrate by patterning a first conductive layer; forming a gate insulating film on the first conductive pattern group; forming a semiconductor pattern on the gate insulating film; forming a second conductive pattern group including a data line crossing the gate line to define a pixel area, a source electrode and a lower data pad electrode connected to the data line, a drain electrode opposed to the source electrode and a pixel electrode connected to the drain electrode on the semiconductor pattern by pattering a second conductive layer, the common electrode and the pixel electrode forming a horizontal electric field in the pixel area during an operation of the LCD; forming a protective film on the second conductive pattern group; forming first to third contact holes for the lower gate pad electrode, the lower common pad electrode and the lower data pad electrode by patterning at least one of the protective film and the gate insulating film using a photo-resist pattern; and forming a third conductive pattern group including an upper gate pad electrode, an upper common pad electrode and an upper data pad electrode by depositing a third conductive layer on the photo-resist pattern and then by lifting-off the photo-resist pattern, the upper gate pad electrode, the upper common pad electrode and the upper data pad electrode connected to the lower gate pad electrode, the lower common pad electrode and the lower data pad electrode, respectively, via the first to third contact holes.

In the method, a stripper penetration path hole is further formed on at least one of the gate line, the data line, the common line, the pixel electrode and the common electrode in the pixel area, and at the same time In the method, the stripper penetration path hole facilitates the lifting off process of the photo-resist pattern.

The photo-resist pattern has protrusions in an interface with the protective film.

The stripper penetration path hole is formed to have a shape of a slit or a plurality of holes.

The method further includes forming an upper storage electrode overlapping a portion of the gate line and a portion of the common line adjacent to the gate line with the gate insulating film and the semiconductor pattern therebetween and electrically connected to the pixel electrode.

In another aspect of the present invention, a method of fabricating a thin film transistor substrate of horizontal electric field applying type includes a first mask process of forming a gate line, a gate electrode and a lower gate pad electrode connected to the gate line, a common line parallel to the gate line, a lower common pad electrode connected to the common line and a common electrode extended from the common line into a pixel area on a substrate from a first conductive layer; a second mask process of entirely coating a gate insulating film, and forming a semiconductor pattern at a desired area of the gate insulating film and forming a data line crossing the gate line and the common line, a source electrode and a lower data pad electrode connected to the data line, a drain electrode opposed to the source electrode and a pixel electrode connected to the drain electrode to form a horizontal electric field along with the common electrode on said semiconductor pattern from a second conductive layer; and a third mask process of entirely coating the protective film, patterning the protective film along with the gate insulating film to define first to fourth contact holes for exposing the lower gate pad electrode, the lower common pad electrode and a lower data pad electrode, and forming an upper gate pad electrode, an upper common pad electrode and an upper data pad electrode from a third conductive layer within the first to fourth contact holes.

In the method, said third mask process includes entirely coating the protective film; forming a photo-resist pattern on the protective film using a mask; patterning the protective film and the gate insulating film by the photo-resist pattern; entirely coating a transparent conductive film onto the photo-resist pattern; and removing the photo-resist pattern covered with the transparent conductive film to pattern the transparent conductive film.

Said third mask process further includes providing a penetration path of a stripper going through a protective film on any at least one of a plurality of signal lines and electrodes formed from said first and second conductive layers in order to remove said photo-resist pattern.

The stripper penetration path is formed in such a manner to go through until the gate insulating film under the protective film.

The stripper penetration path includes any at least one of a slit and a plurality of holes provided along any at least one of said plurality of signal lines and electrodes.

The stripper penetration path is provided on any at least one of a common electrode and a pixel electrode.

Herein, said third conductive layer making an interface with the patterned protective film is left within the stripper penetration path.

Herein, the first to third contact holes are used as the stripper penetration path.

Said second mask process further includes forming an upper storage electrode overlapping with a portion of the gate line and a portion of the common line adjacent to the gate line with having the gate insulating film and the semiconductor pattern therebetween and connected to the pixel electrode from said second conductive layer.

Said third conductive layer contains any one of a transparent conductive layer, titanium and tungsten.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3A to 3D are sectional views illustrating a method of fabricating the thin film transistor substrate shown in FIG. 2;

DETAILED DESCRIPTION OF THE ILLUSTRATED EMBODIMENTS

Reference will now be made in detail to the embodiments of the present invention, examples of which are illustrated in the accompanying drawings.

Figure 1:
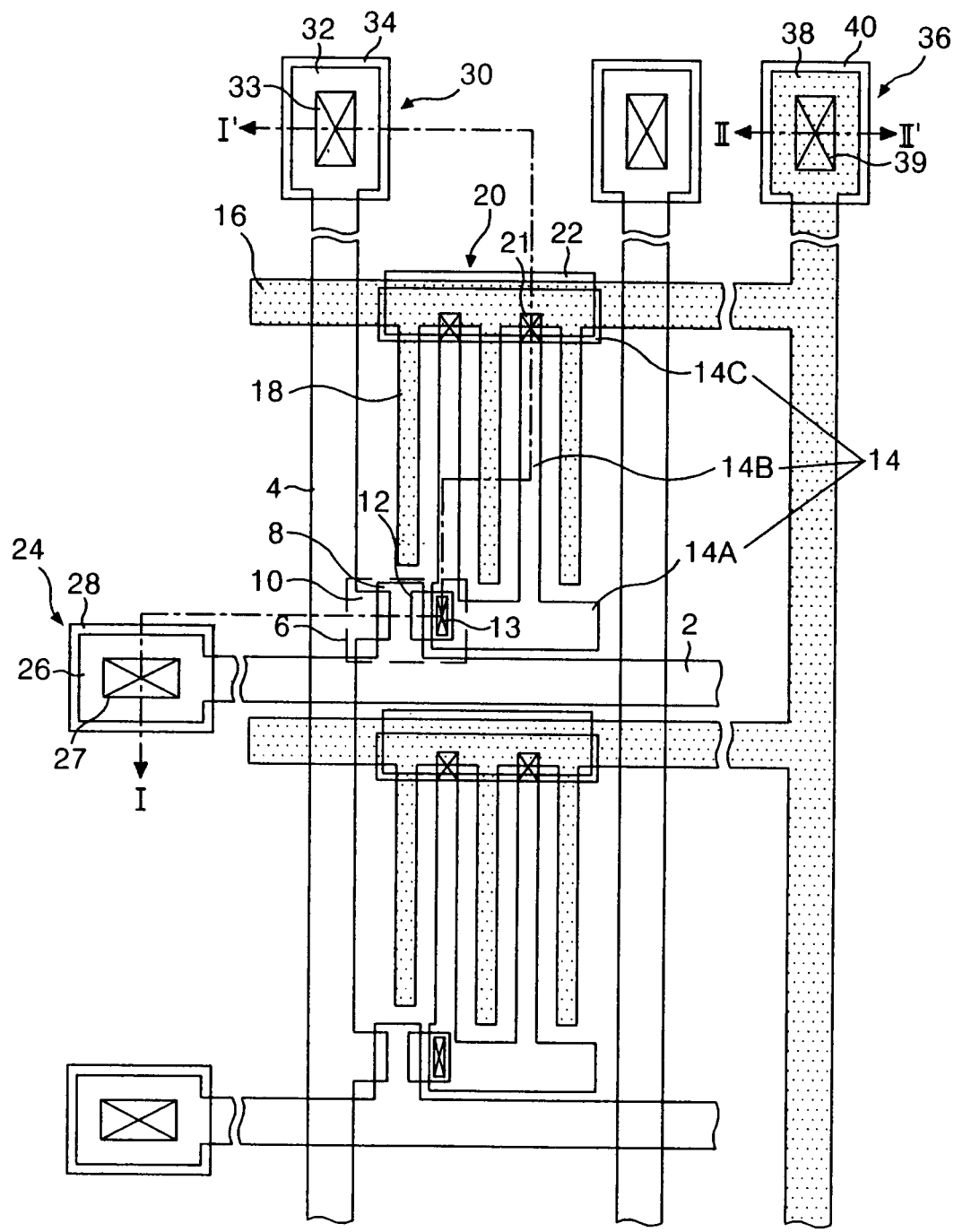
FIG. 1 is a plan view illustrating a structure of a thin film transistor substrate of a horizontal electric type fabricated by a four-mask process according to a related art.
Figure 2:
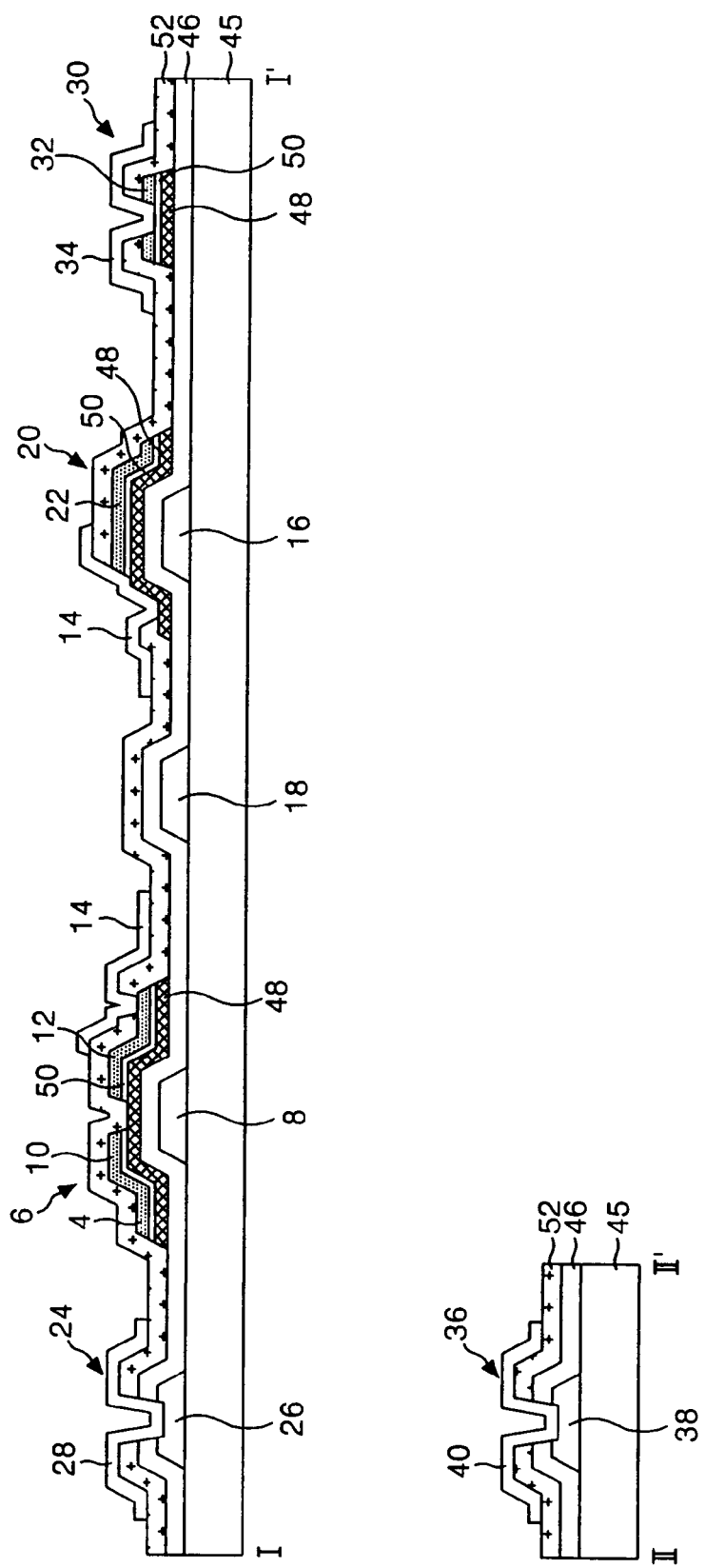
FIG. 2 is sectional views of the thin film transistor substrate taken along the lines I-I' and II-II' in FIG. 1.
Figure 3B:
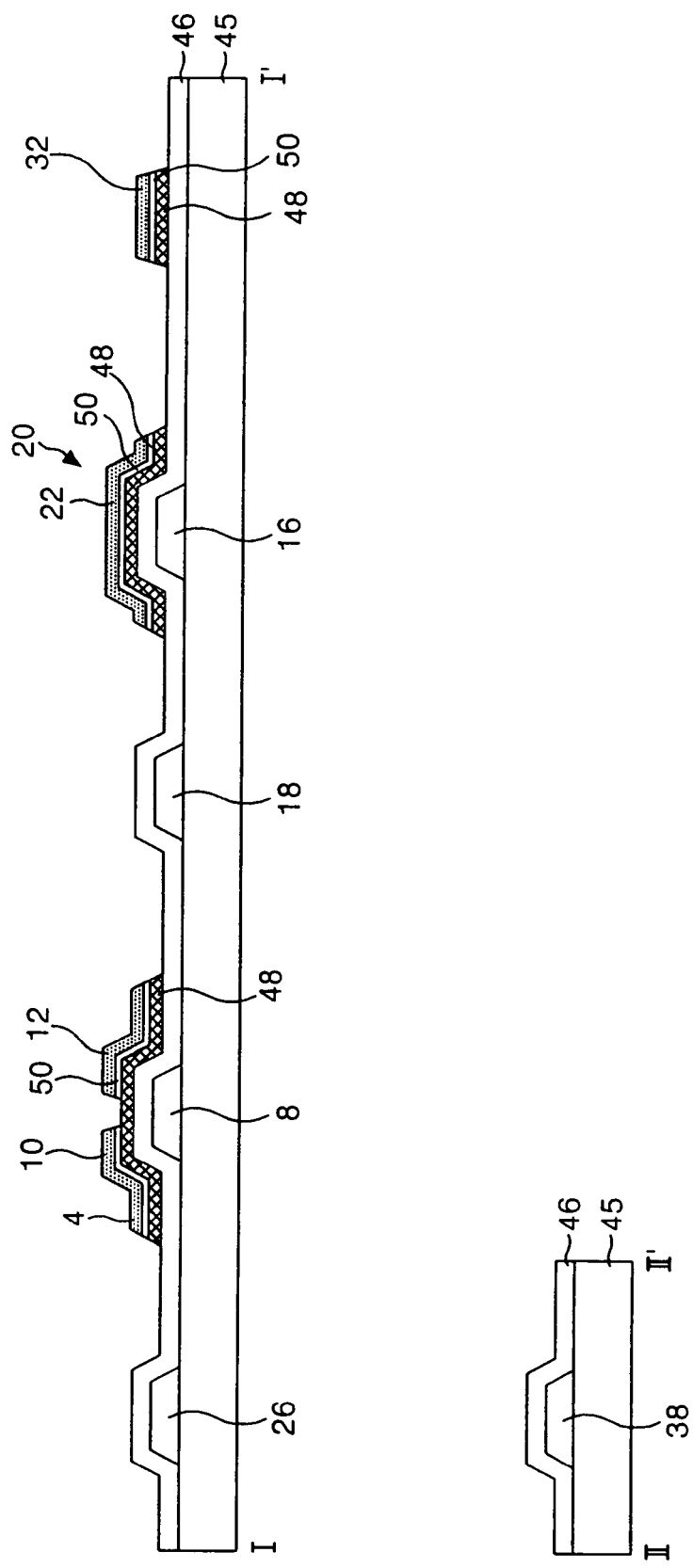
Figure 3D:
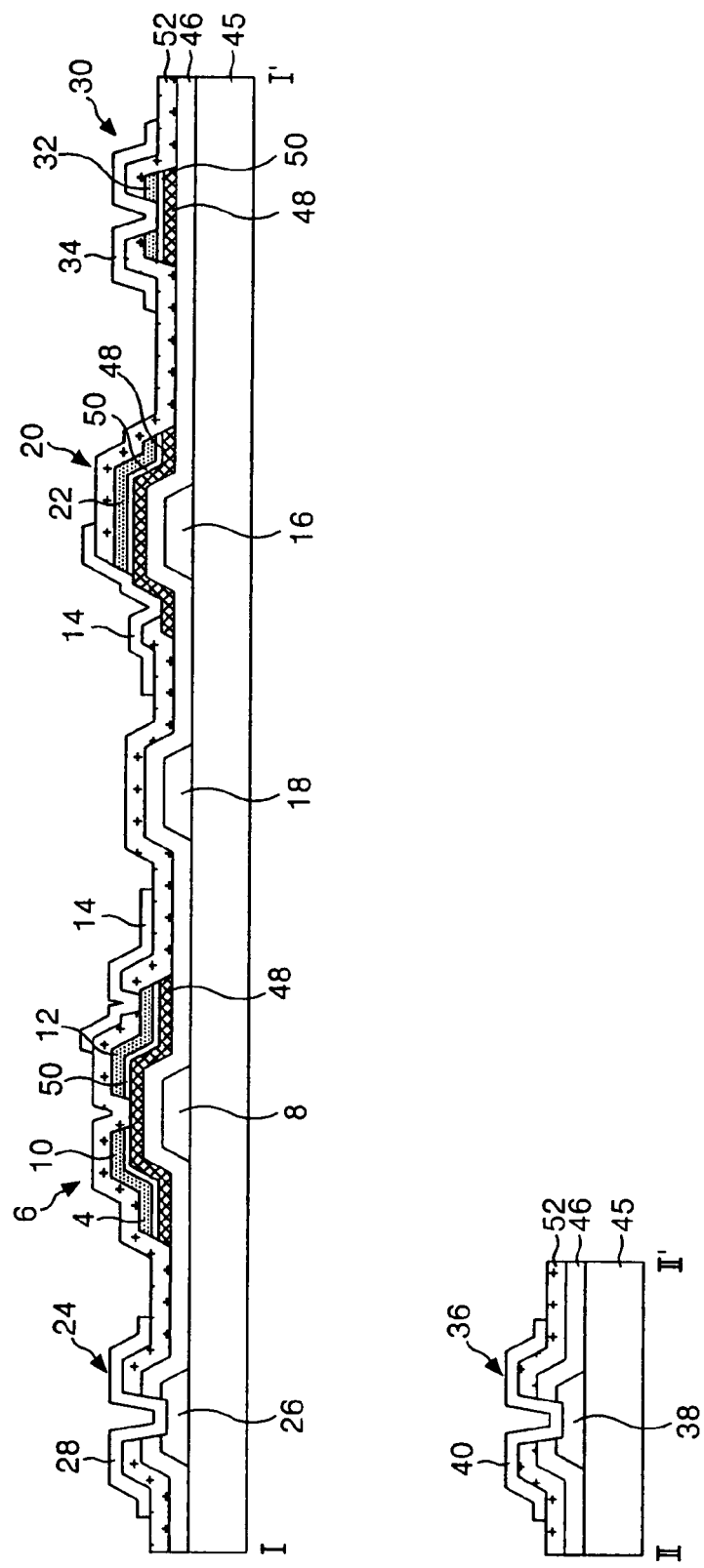
Figure 4:
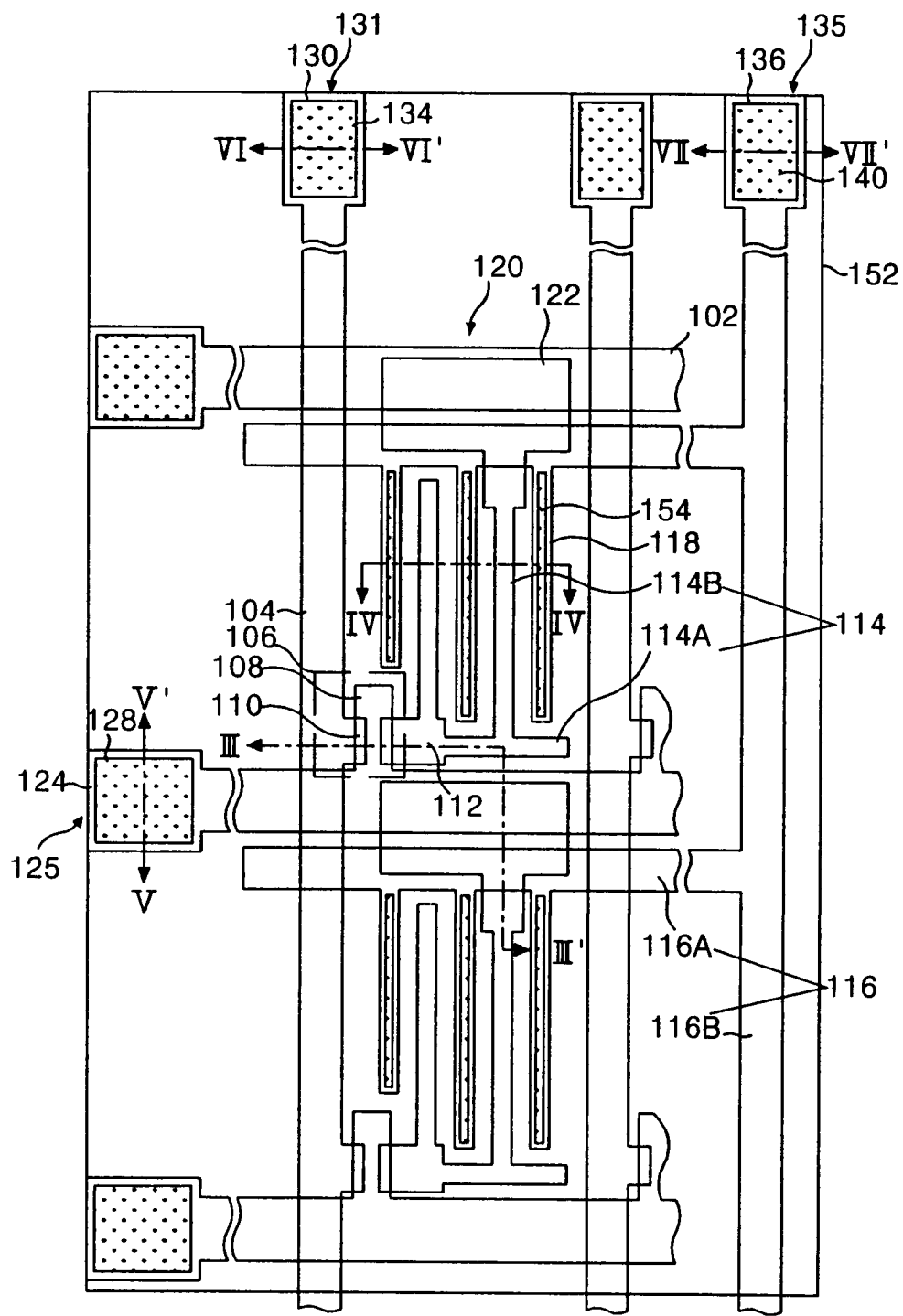
FIG. 4 is a plan view illustrating a structure of a thin film transistor substrate of a horizontal electric field type according to an embodiment of the present invention.
Figure 5:
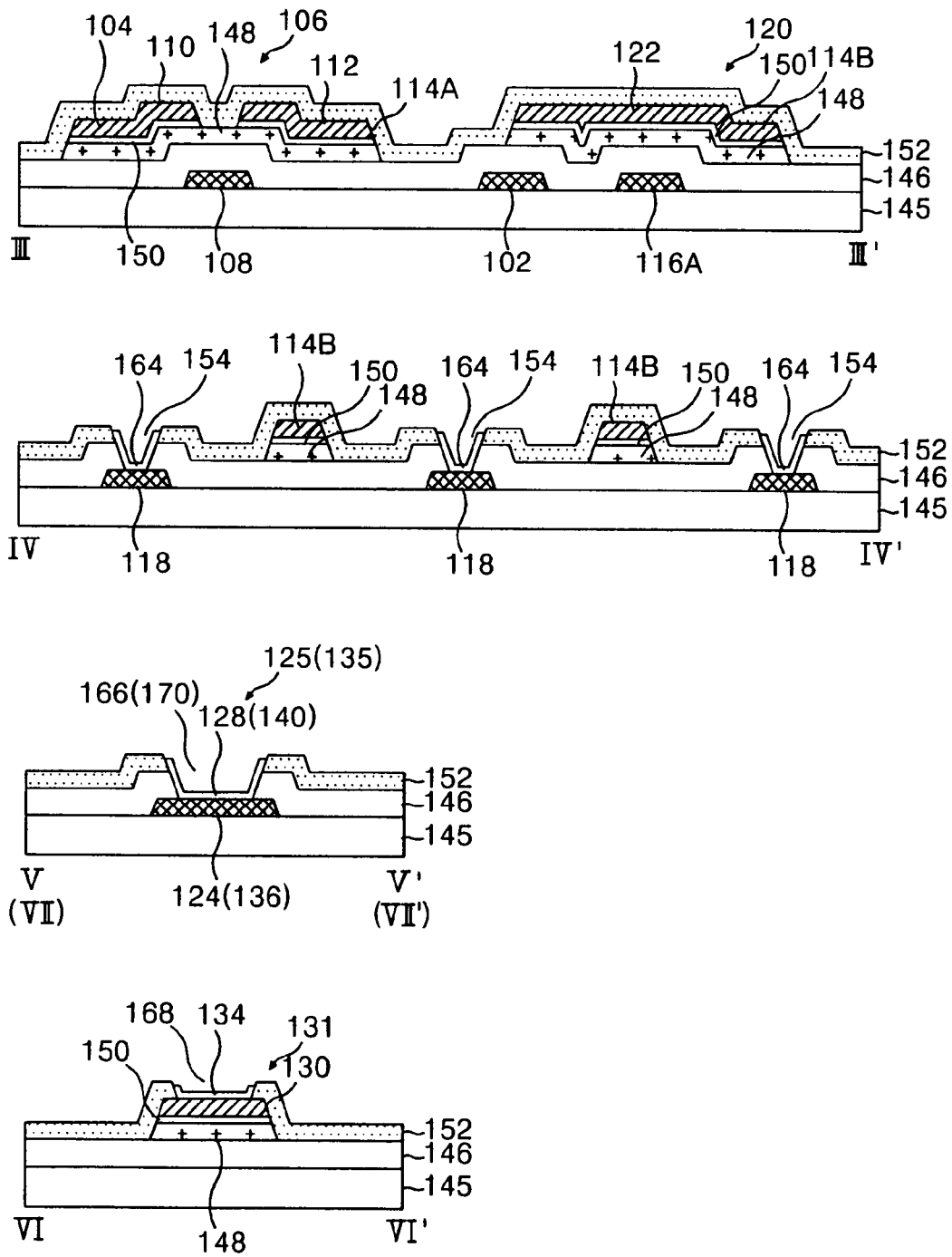
FIG. 5 is a sectional view of the thin film transistor substrate taken along the lines III-III', IV-IV', V-V, VI-VI and VII-VII in FIG. 4.

FIG. 4 is a plan view illustrating a structure of a thin film transistor substrate of a horizontal electric field type according to an embodiment of the present invention, and FIG. 5 is a sectional view of the thin film transistor substrate taken along the lines III-III', IV-IV', V-V, VI-VI and VII-VII in FIG. 4.

Referring to FIG. 4 and FIG. 5, the thin film transistor substrate includes a gate line 102 and a data line 104 provided on a lower substrate 145 in such a manner to cross each other with a gate insulating film 146 therebetween, a thin film transistor 106 provided near each crossing, a pixel electrode 114 and a common electrode 118 provided at a pixel area defined by the gate line 102 and the data line 104 for forming a horizontal field, and a common line 116 connected to the common electrode 118. The thin film transistor substrate further includes a storage capacitor 120 provided at an overlapping portion among a pre-stage gate line 102, the common line 116 and an upper storage electrode 122, a gate pad 125 connected to the gate line 102, a data pad 131 connected to the data line 104, and a common pad 135 connected to the common line 116. The gate line 102 supplied with a gate signal and the data line 104 supplied with a data signal define the pixel area, with the gate insulating film 146 therebetween. Herein, the gate line 102 is formed from a first conductive layer (i.e., a gate metal layer), while the data line 104 is formed from a second conductive layer (i.e., a source/drain metal layer).

The common line 116 and the common electrode 118 supply a reference voltage for driving the liquid crystal. The common line 116 further includes an internal common line 116A provided in parallel to the gate line 102 at a display area, and an external common line 116B commonly connected to the internal common line 116A at a non-display area. The common electrode 118 has a finger shape and is extended from the internal common line 116A into the pixel area. The common line 116 and the common electrode 118 are formed from the first conductive layer, along with the gate line 102.

The thin film transistor 106 charges the data signal of the data line 104 to the pixel electrode 114 in response to the gate signal of the gate line 102. To this end, the thin film transistor 106 includes a gate electrode 108 connected to the gate line 102, a source electrode 110 connected to the data line 104, and a drain electrode 112 opposed to the source electrode 110. The thin film transistor 106 further includes an active layer 148 overlapping the gate electrode 108 with a gate insulating film 146 therebetween to define a channel between the source electrode 110 and the drain electrode 112. On the active layer 148 excluding the channel region is an ohmic contact layer 150 to form an ohmic contact with the source electrode 110 and the drain electrode 112. Further, the active layer 148 and the ohmic contact layer 150 overlaps the data line 104, a lower data pad electrode 130 and an upper storage electrode 122, which are formed from the second conductive layer, along with the source electrode 110 and the drain electrode 112.

The pixel electrode 114 forms a horizontal electric field at the pixel area, along with the common electrode 118, and is connected to the drain electrode 112 of the thin film transistor 106. The pixel electrode 114 is formed from the second conductive layer along with the drain electrode 112 and is integral thereto. More specifically, the pixel electrode 114 includes a horizontal part 114A provided in parallel to the gate line 102 and integral to the drain electrode 112, and a finger part 114B extended from the horizontal part 114A into the pixel area to be in parallel to the common electrode 118.

Thus, a horizontal electric field is formed between the pixel electrode 114 to which a data signal is applied via the thin film transistor 106 and the common electrode 118 to which a reference voltage is applied via the common line 116. More specifically, a horizontal electric field is formed between the finger part 114B of the pixel electrode 114 and the common electrode 118. Liquid crystal molecules arranged in a horizontal direction between the thin film transistor substrate and the color filter substrate rotate by such a horizontal electric field due to a dielectric anisotropy of the liquid crystal molecules. Transmittance of the pixel area is differentiated depending upon an extent of the rotation of the liquid crystal molecules, thereby implementing gray scale levels.

The storage capacitor 120 is constructed with a portion of the pre-stage gate line 102 as a first lower storage electrode, a portion of an internal common line 116A as a second lower storage electrode, an upper storage electrode 122 overlapping the gate line 102 and the internal common line 116A, the gate insulating film 146, the active layer 148 and the ohmic contact layer 150, as shown in FIG. 5. The gate insulating film 146, the active layer 148 and the ohmic contact layer 150 are sandwiched between the first and second lower storage electrodes 102 and 116 A and the upper storage electrode 122. Herein, the upper storage electrode 122 is formed from the second conductive layer along with the pixel electrode 114 and is integral thereto. The storage capacitor 120 maintains a data signal charged in the pixel electrode 114 until the next data signal is charged.

The gate line 102 is connected to a gate driver (not shown) via the gate pad 125. The gate pad 125 is constructed with a lower gate pad electrode 124 extended from the gate line 102, and an upper gate pad electrode 128 connected to the lower gate pad electrode 124 via a first contact hole 166 passing through the gate insulating film 146 and the protective film 152.

The common line 116 receives a reference voltage from an external reference voltage source (not shown) through the common pad 135. The common pad 135 includes a lower common pad electrode 136 extended from the common line 116, and an upper common pad electrode 140 connected to the lower common pad electrode 136 via a second contact hole 170 passing through the gate insulating film 146 and the protective film 152.

The data line 104 is connected to the data driver (not shown) via the data pad 131. The data pad 131 includes a lower data pad electrode 130 extended from the data line 104, and an upper data pad electrode 134 connected to the lower data pad electrode 130 via a third contact hole 168 passing through the protective film 152.

In such a thin film transistor substrate, the upper gate pad electrode 128, the upper data pad electrode 134 and the upper common pad electrode 140 are formed from a third conductive layer. The third conductive layer is patterned by a lift-off process when removing a photo-resist pattern used for patterning the protective film 152 and the gate insulating film 146. Thus, the patterned third conductive layer makes an interface with the protective film 152. A method of fabricating the thin film transistor substrate according to the embodiment of the present invention can reduce one mask process by patterning the third conductive layer using such a lift-off process.

In order to facilitate such a lift-off process, a stripper penetration path 154 passing through the gate insulating film 146 and the protective film 152 or passing through the protective film 152 are further provided on the above-mentioned signal lines and electrodes. For instance, the stripper penetration path 154 is provided on the common electrode 118 or the pixel electrode 114, and the third conductive pattern makes an interface with the protective film 152 within the stripper penetration path 154. Such a stripper penetration path 154 provided at portions having no photo-resist pattern allows a stripper to easily infiltrate into the interface between the photo-resist pattern and the protective film 152, along with the first to third contact holes 166, 170 and 168.

A method of fabricating the thin film transistor substrate according to the embodiment of the present invention will be described in detail.

Figure 6A:
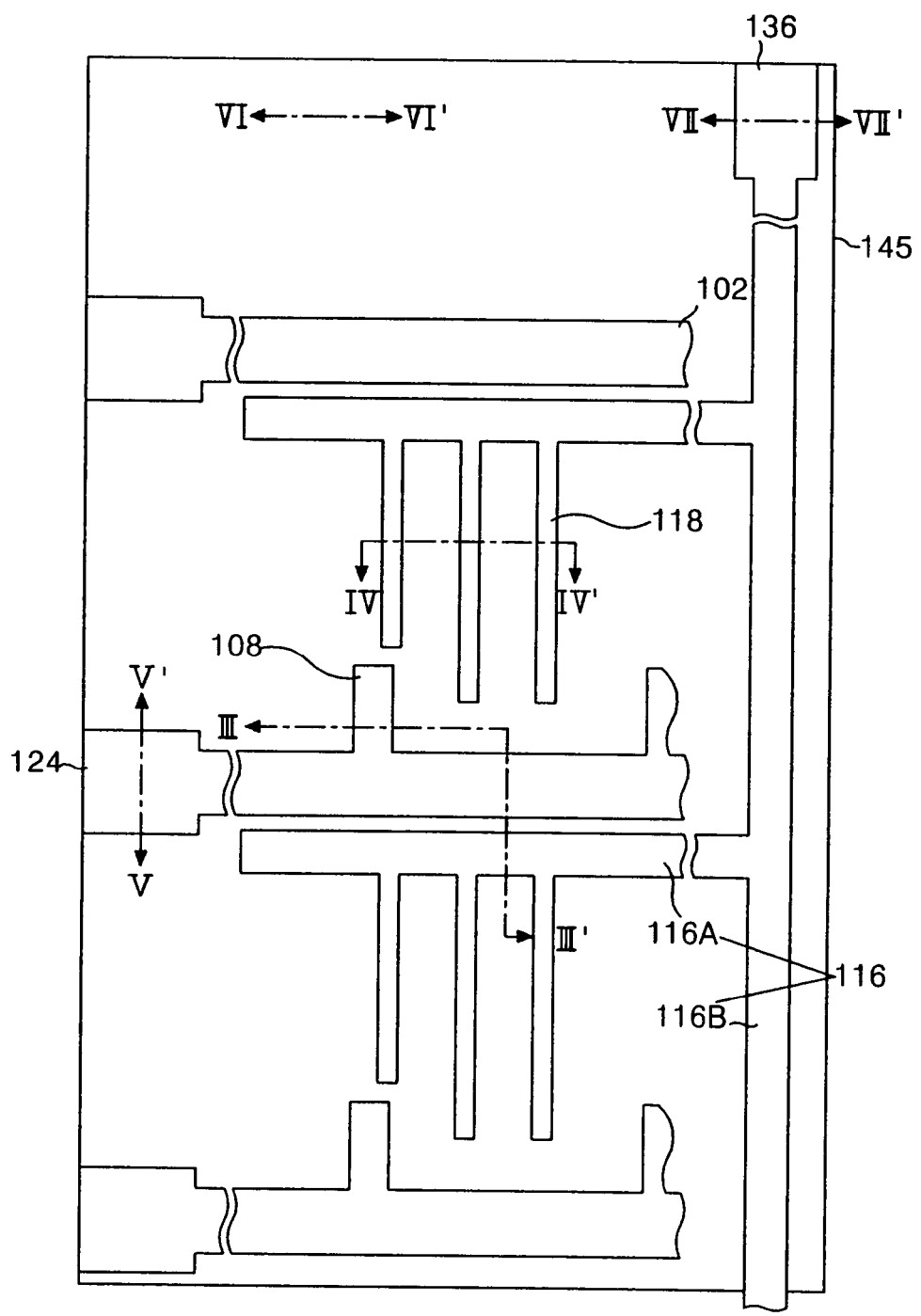
FIG. 6A and FIG. 6B are a plan view and a sectional view, respectively, for explaining a first mask process in a fabricating method of the thin film transistor substrate according to the embodiment of the present invention.
Figure 6B:
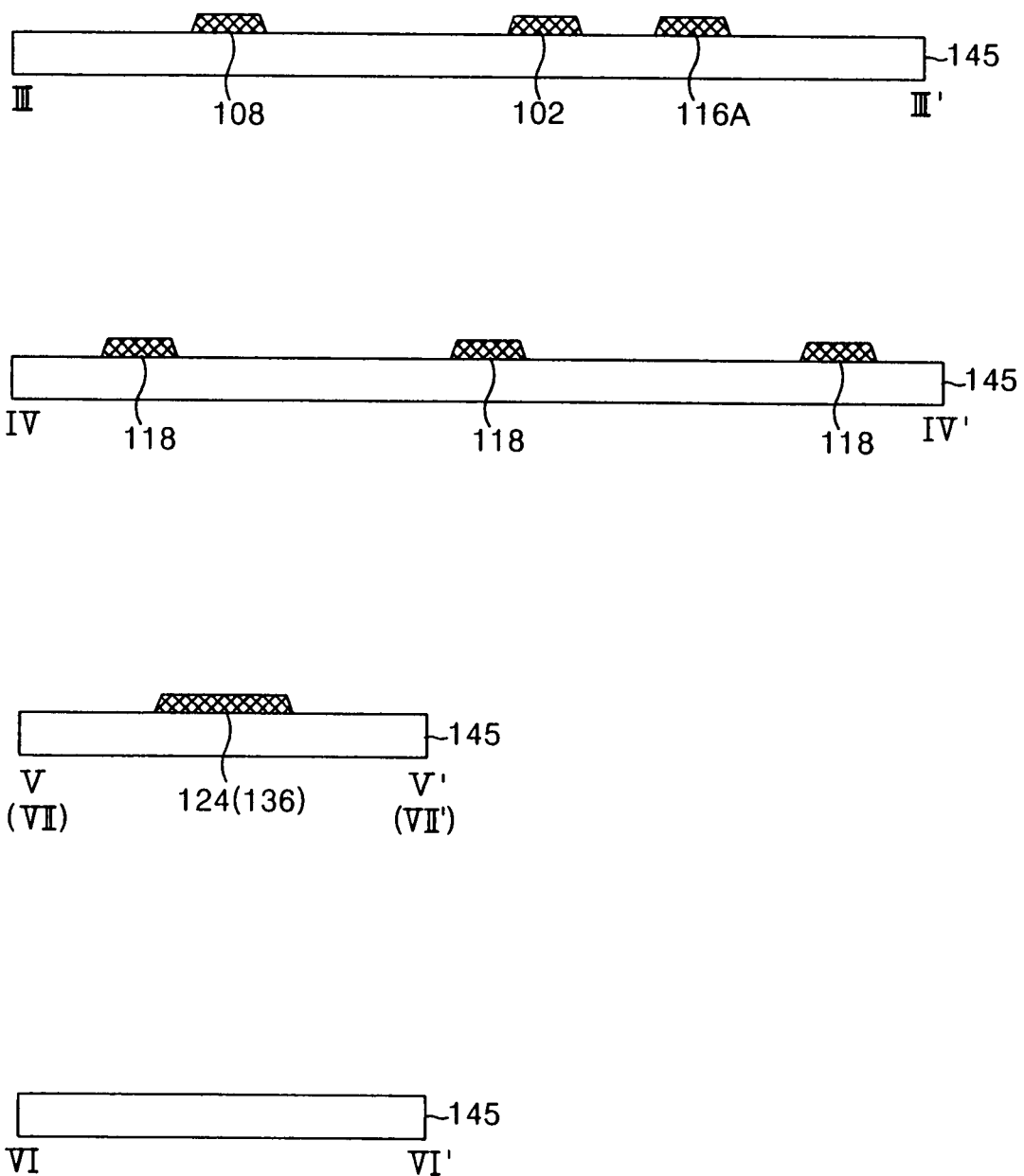

FIG. 6A and FIG. 6B are a plan view and a sectional view, respectively, for explaining a first mask process in a fabricating method of the thin film transistor substrate of a horizontal electric field type according to the embodiment of the present invention.

As shown in FIG. 6A and FIG. 6B, a first conductive pattern group including the gate line 102, the gate electrode 108 and the lower gate pad electrode 124, the common line 116, the common electrode 118 and the lower common pad electrode 136 is provided on the lower substrate 145 by a first mask process. More specifically, a first conductive layer is formed on the upper substrate 145 by a deposition technique such as sputtering. Then, the first conductive layer is patterned by photolithography and etching processes using a first mask to thereby form the first conductive pattern group including the gate line 102, the gate electrode 108, the lower gate pad electrode 124, the common line 116, common electrode 118 and the lower common pad electrode 136. Herein, the first conductive layer is formed of Cr, MoW, Cr/Al, Cu, Al(Nd), Mo/Al, Mo/Al(Nd) or Cr/Al(Nd), etc.

Figure 7A:
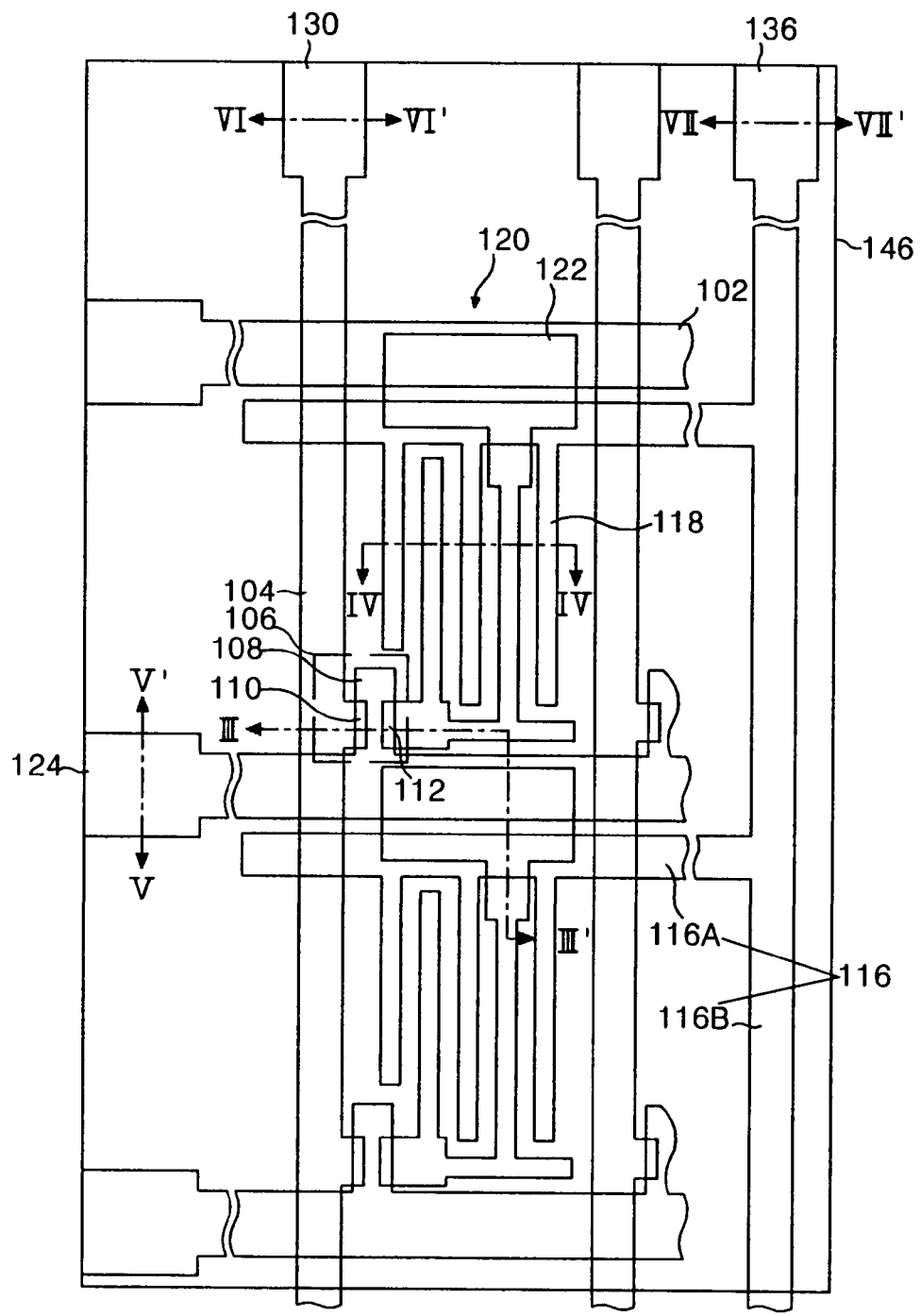
FIG. 7A and FIG. 7B are a plan view and a sectional view, respectively, for explaining a second mask process in a fabricating method of the thin film transistor substrate according to the embodiment of the present invention.
Figure 7B:
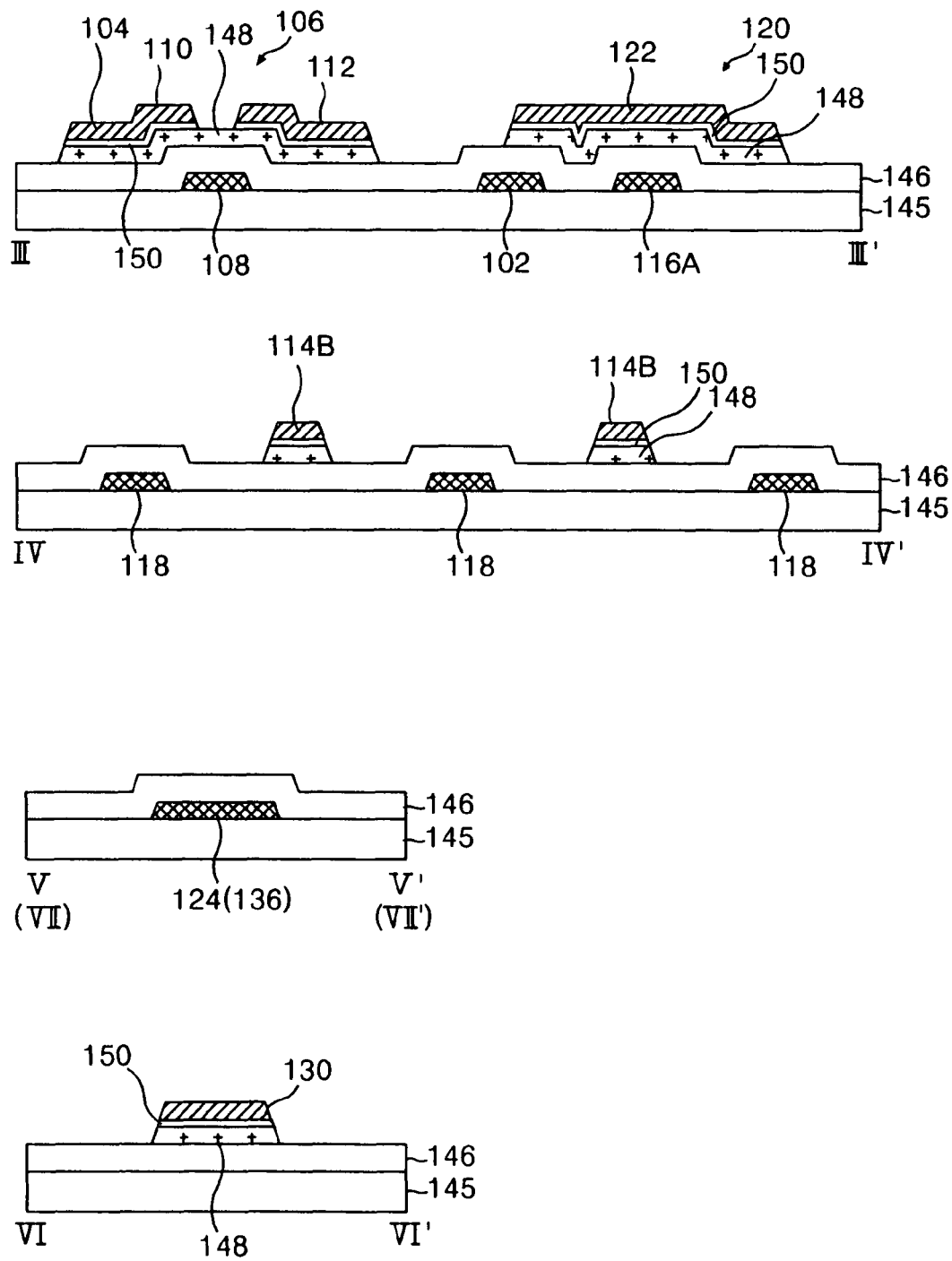

FIG. 7A and FIG. 7B are a plan view and a sectional view, respectively, for explaining a second mask process in a fabricating method of the thin film transistor substrate of a horizontal electric field type according to the embodiment of the present invention, and FIG. 8A to FIG. 8E are sectional views for explaining the second mask process in more detail.

The gate insulating film 146 is formed on the lower substrate 145 provided with the first conductive pattern by such deposition techniques as plasma enhanced chemical vapor deposition (PECVD), sputtering and the like. Herein, the gate insulating film 146 is formed of an inorganic insulating material such as silicon nitride ($SiN_x$) or silicon oxide ($SiO_x$).

Figure 8A:
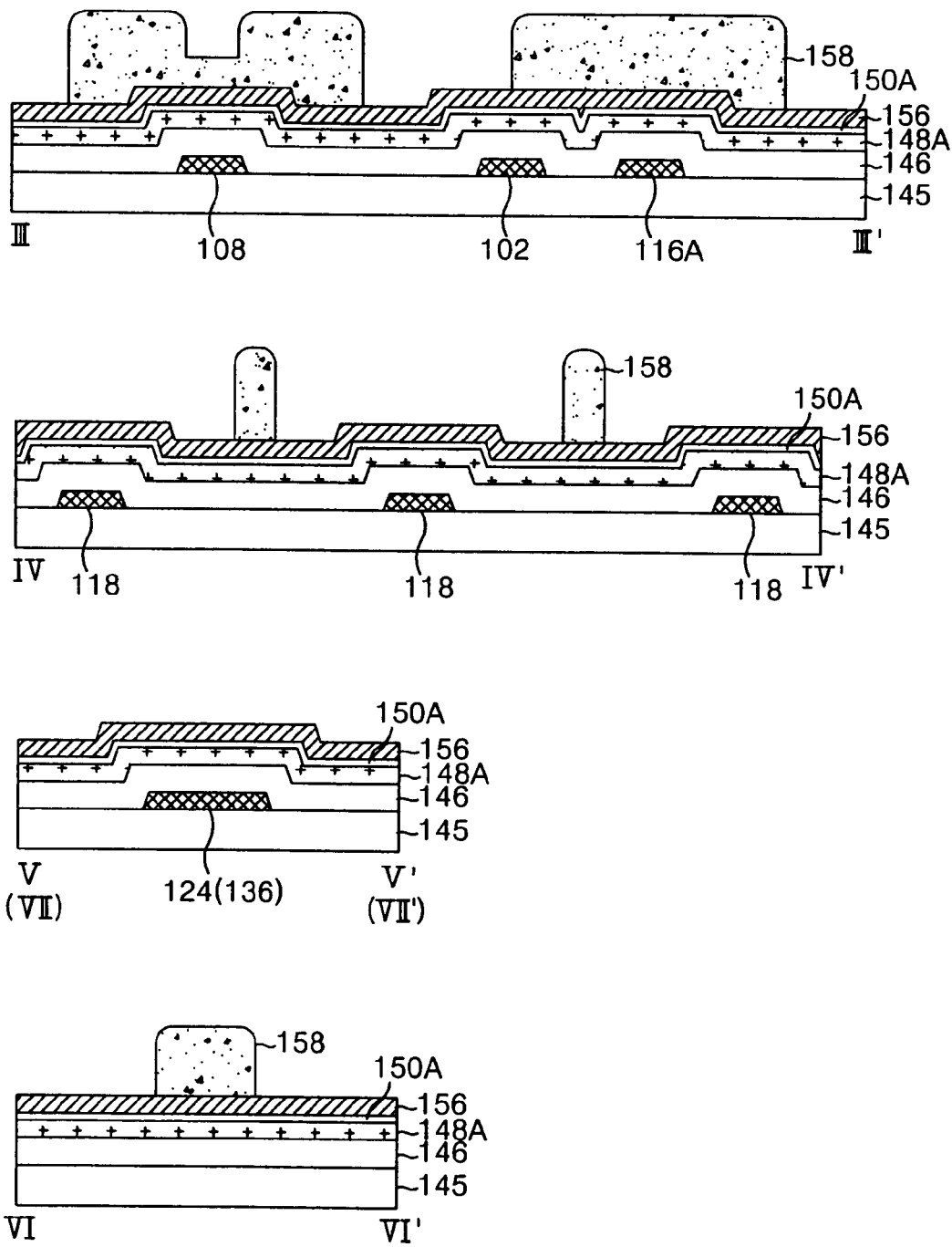
FIG. 8A to FIG. 8D are sectional views for explaining the second mask process in more detail.

As shown in FIG. 7A and FIG. 7B, a semiconductor pattern including the active layer 148 and the ohmic contact layer 150 disposed on the gate insulating film 146 and a second conductive pattern group including the data line 104, the source electrode 110, the drain electrode 112, the lower data pad electrode 130, the pixel electrode 114 and the upper storage electrode 122 are formed by a second mask process. More specifically, as shown in FIG. 8A, an amorphous silicon layer 148A, an $n^+$ amorphous silicon layer 150A and a second conductive layer 156 are sequentially formed on the gate insulating film 146 by such deposition techniques as plasma enhanced chemical vapor deposition (PECVD) and sputtering, etc. Herein, the second conductive layer 156 is formed of Cr, MoW, Cr/Al, Cu, Al(Nd), Mo/Al, Mo/Al(Nd) or Cr/Al (Nd), etc.

Next, a photo-resist film is entirely coated onto the second conductive layer 156 and then a photo-resist pattern 158 having a step coverage shown in FIG. 8A is formed thereon by a photolithography process using a second mask that is a partial-exposure mask. In this case, a partial-exposure mask having a diffractive exposing part (or a semi-transmitting or transflective part) at a portion where a channel of the thin film transistor is to be formed is used as the second mask. Thus, the photo-resist pattern 158 corresponding to the diffractive exposing part (or the semi-transmitting part) of the second mask has a lower height than the photo-resist pattern 158 corresponding to a transmitting part (or a shielding part) of the second mask. In other words, the photo-resist pattern 158 at the channel portion has a lower height than the photo-resist pattern 158 at other source/drain metal pattern portions.

Figure 8B:
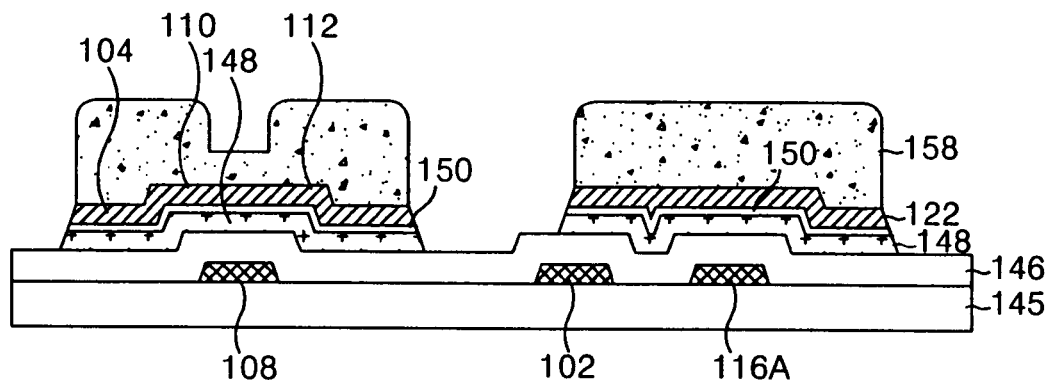
Figure 8B:
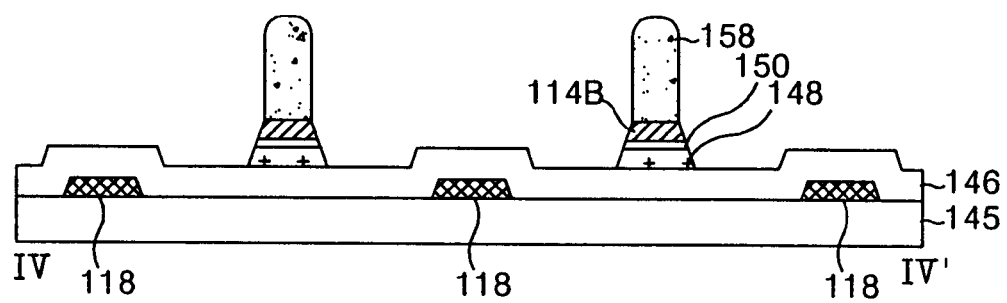
Figure 8B:
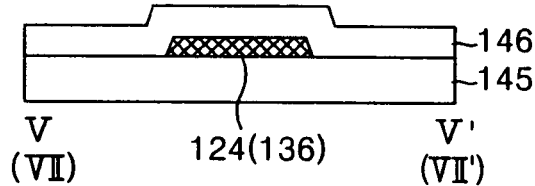
Figure 8B:
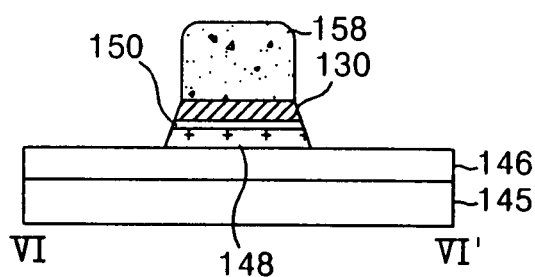

Subsequently, the second conductive layer 156 is patterned by a wet-etching process using the photo-resist pattern 158 to thereby form the second conductive metal pattern group including the data line 104, the source electrode 110 of the thin film transistor portion, the drain electrode 112 being integral to the source electrode 110, the pixel electrode 114, the lower data pad electrode 130 and the upper storage electrode 122, as shown in FIG. 8B. Herein, the upper storage electrode 122 overlaps a portion of the gate line 102 and the internal common line 116A, while the pixel electrode 114 is integral to the drain electrode 112 and the upper storage electrode 122. Further, the $n^+$ amorphous silicon layer 150A and the amorphous silicon layer 148A are patterned at the same time by a dry-etching process using the same photo-resist pattern 158 to thereby provide a structure in which the ohmic contact layer 150 and the active layer 148 are formed with the second conductive pattern group as, shown in FIG. 8B.

Figure 8C:
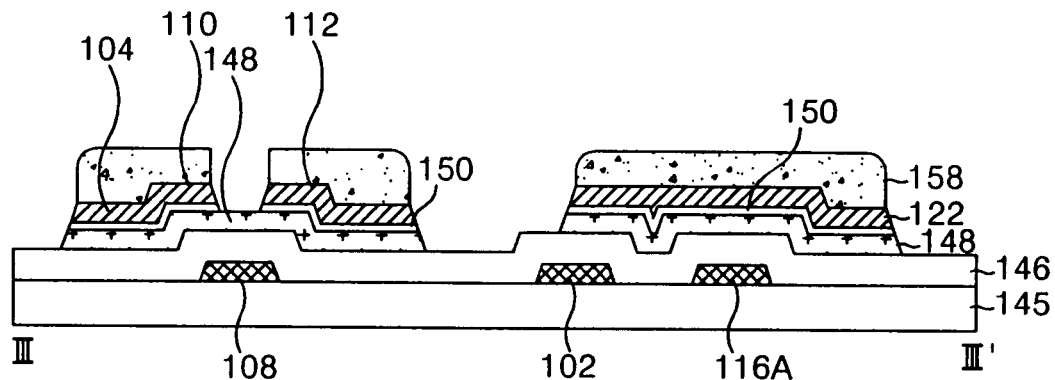
Figure 8C:
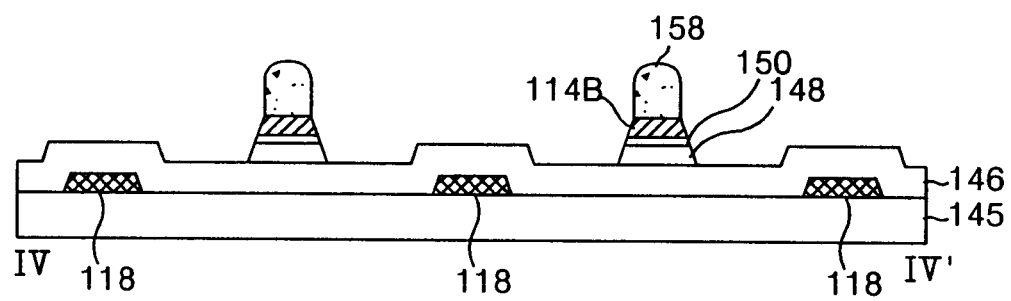
Figure 8C:
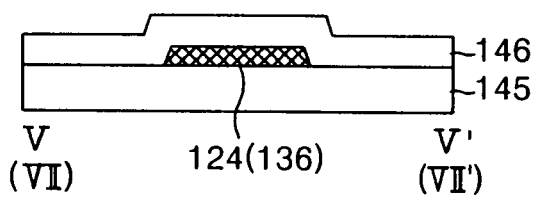
Figure 8C:
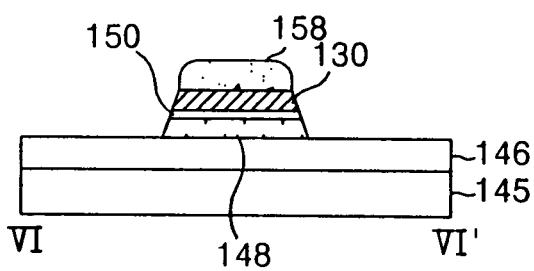
Figure 8D:
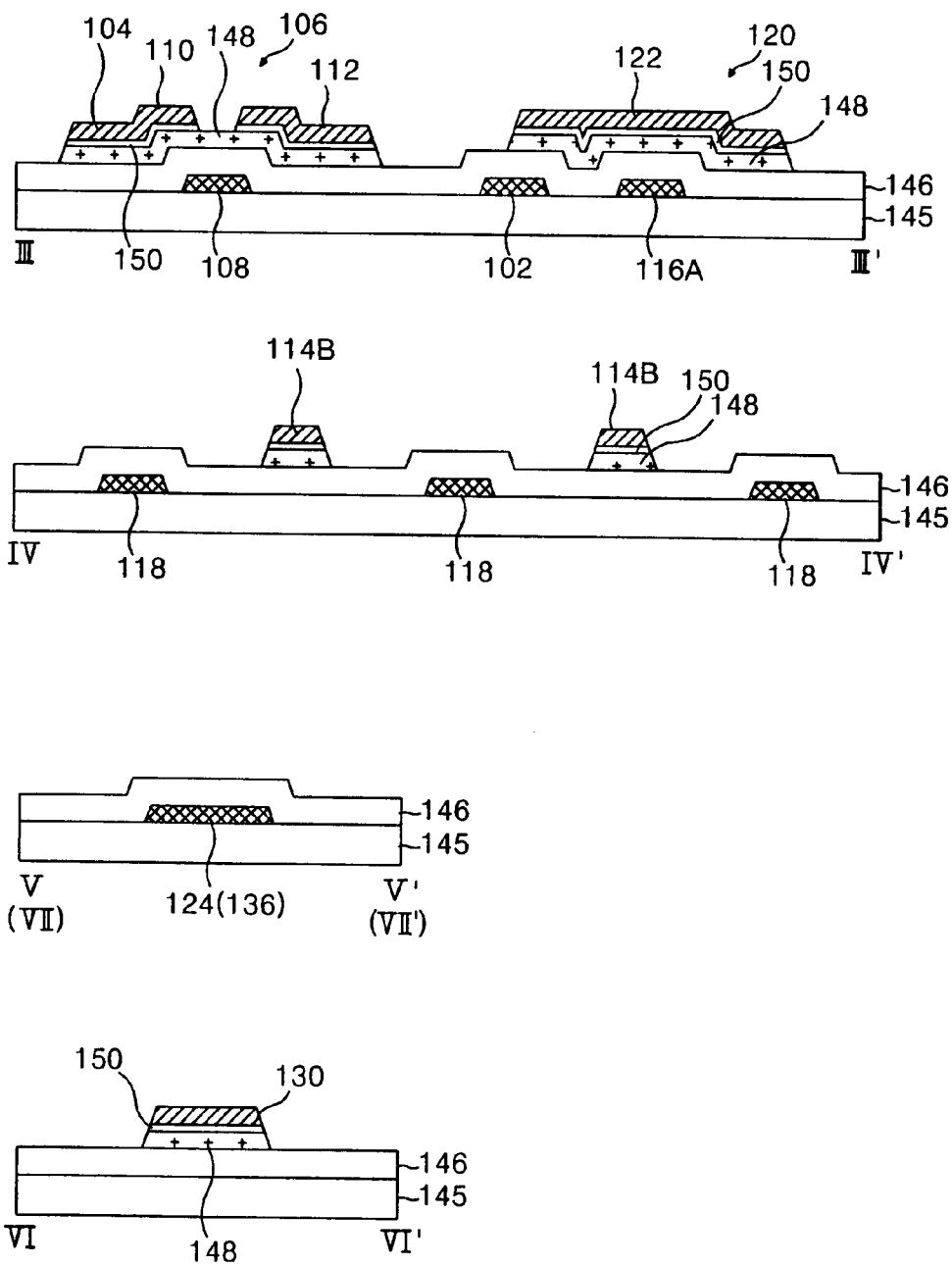

Then, as shown in FIG. 8C, the photo-resist pattern 158 at the channel portion having a relatively low height is removed by an ashing process using an oxygen ($O_2$) plasma, while the photo-resist pattern 158 at other second conductive pattern group portions becomes to have a lower height than the height before the ashing process. The second conductive layer and the ohmic contact layer 150 at a portion in which the channel is formed are etched by a dry-etching process using the photo-resist pattern 158 left in this manner, thereby disconnecting the source electrode 110 from the drain electrode 112 and exposing the active layer 148, as shown in FIG. 8C. Thus, a channel made from the active layer 148 is formed between the source electrode 110 and the drain electrode 112. Then, the photo-resist pattern 158 left on the second conductive pattern group portion is entirely removed by a stripping process, as shown in FIG. 8D.

Figure 9A:
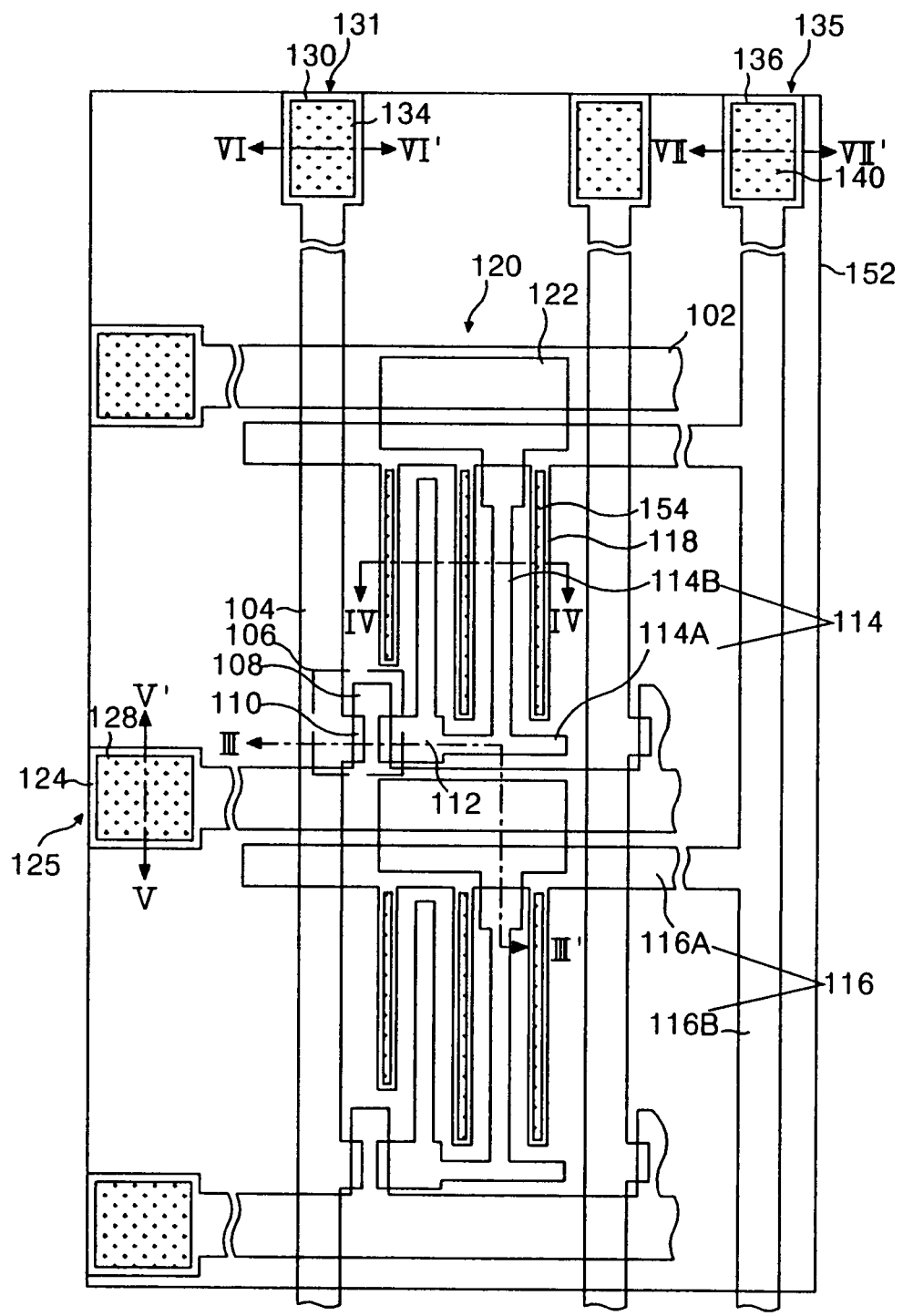
FIG. 9A and FIG. 9B are a plan view and a section view, respectively, for explaining a third mask process in a fabricating method of the thin film transistor substrate according to the embodiment of the present invention.
Figure 9B:
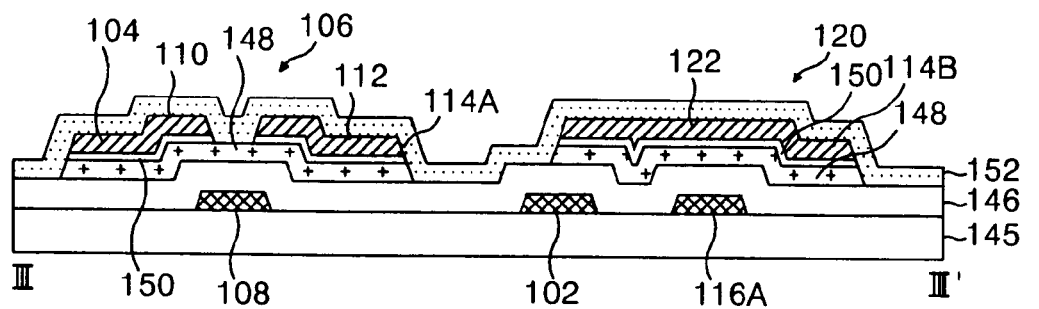
Figure 9B:
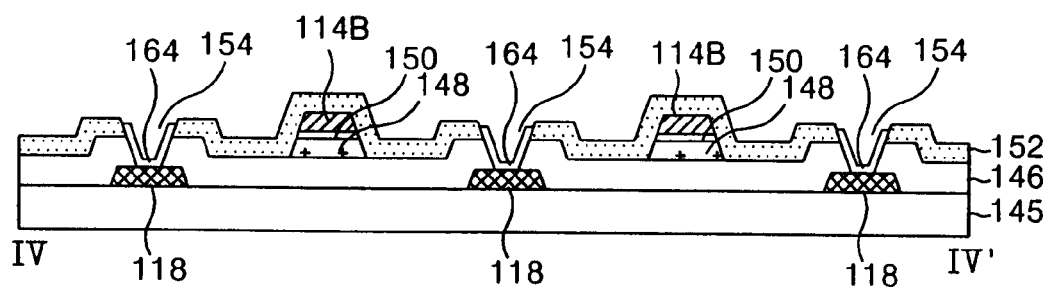
Figure 9B:
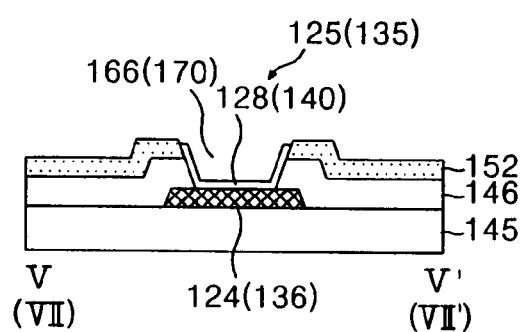
Figure 9B:
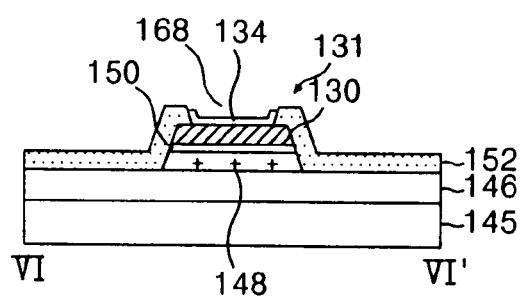

FIG. 9A and FIG. 9B are a plan view and a sectional view, respectively, for explaining a third mask process in a fabricating method of the thin film transistor substrate of a horizontal electric field type according to the embodiment of the present invention, and FIG. 10A to FIG. 10D are sectional views for explaining the third mask process in more detail.

Figure 10A:
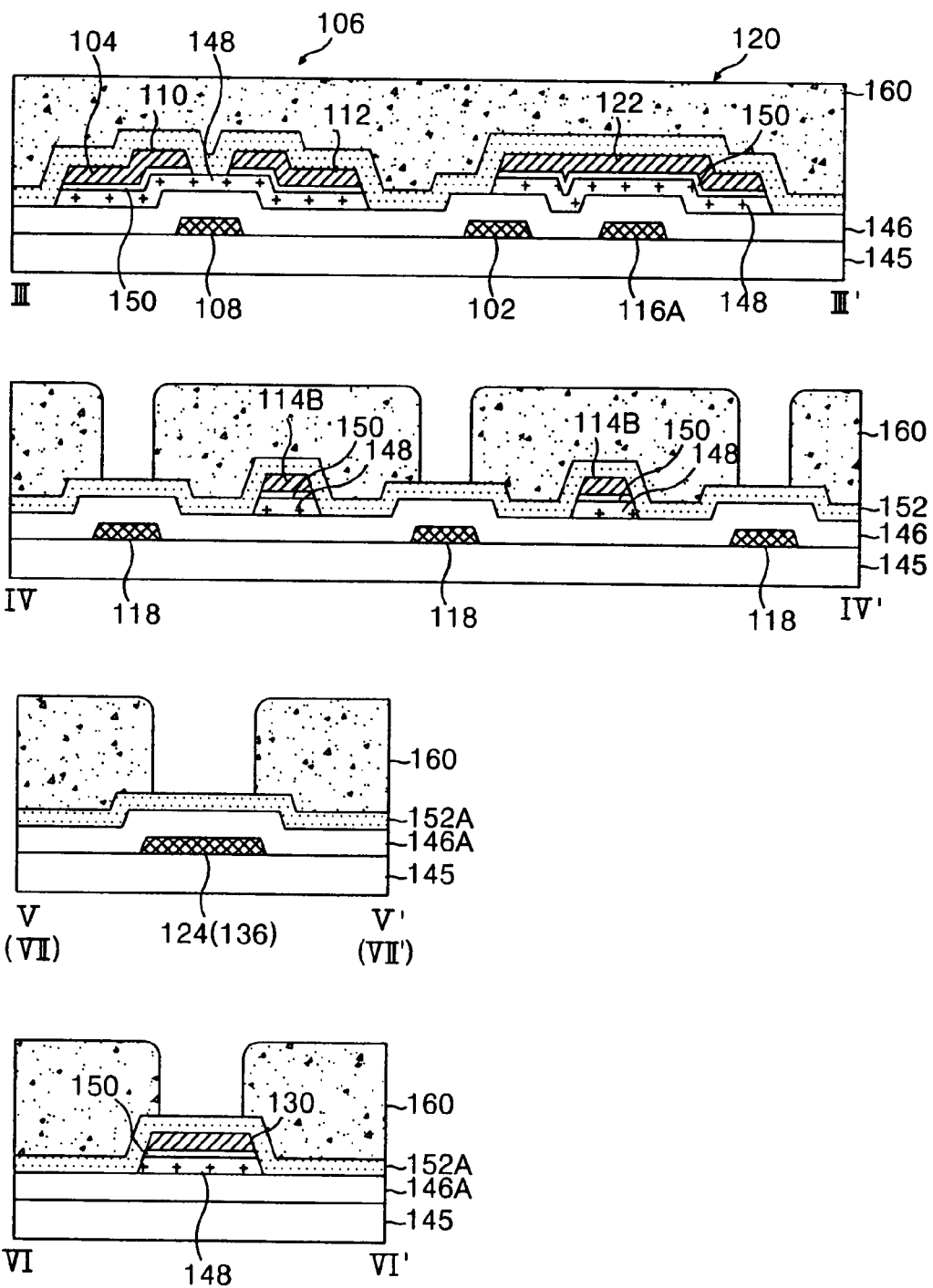
FIG. 10A to FIG. 10D are section views for explaining the third mask process in more detail.
Figure 10B:
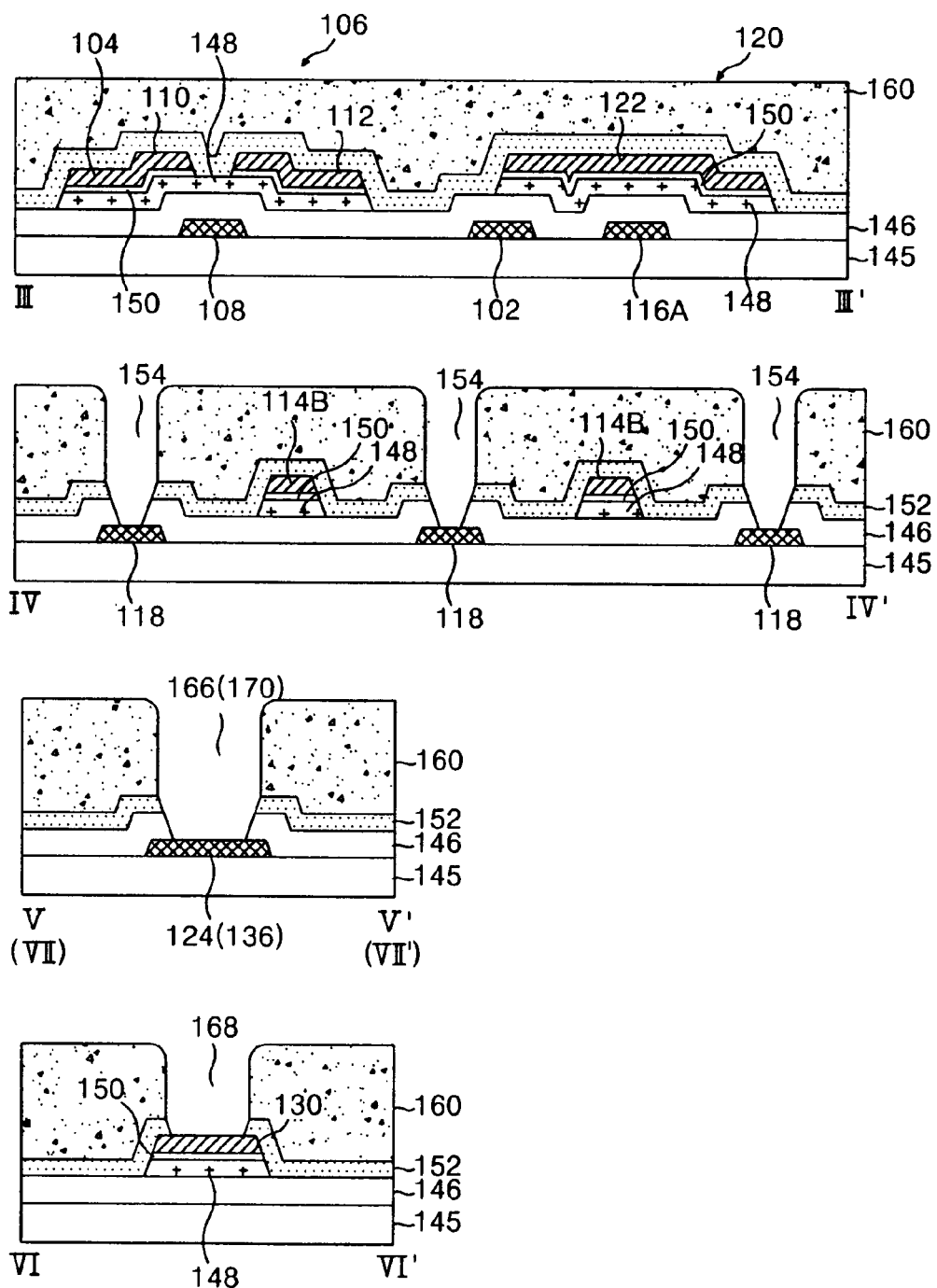

As shown in FIG. 9A and FIG. 9B, the protective film 152 and the gate insulating film 146 are patterned by a third mask process, and the third conductive pattern group including the upper gate pad electrode 128, the upper data pad electrode 134 and the upper common pad electrode 140 is formed. The third conductive pattern group makes an interface with the patterned protective film 152 without any overlapping portions. More specifically, the protective film 152 is entirely formed on the gate insulating film 146 provided with the second conductive pattern group, as shown in FIG. 10A. Herein, the protective film 152 is formed of an inorganic insulating material similar to the gate insulating film 146 or an organic insulating material. Further, a photo-resist pattern 160 is formed on the protective film 152 by a photolithography process using a third mask, as shown in FIG. 10A. The protective film 152 and the gate insulating film 146 are patterned by a dry-etching process using the photo-resist pattern 160 to thereby form the first to third contact holes 166, 170 and 168 passing through the protective film 152 or the protective film 152 and the gate insulating film 146 and the stripper penetration path 154, as shown in FIG. 10B. Herein, the first contact hole 166 exposes the lower gate pad electrode 124, the second contact hole 170 exposes the lower common pad electrode 136, and the third contact hole 168 exposes the lower data pad electrode 130. Further, the stripper penetration path 154 exposes the common electrode 118 or the pixel electrode 114.

Figure 10C:
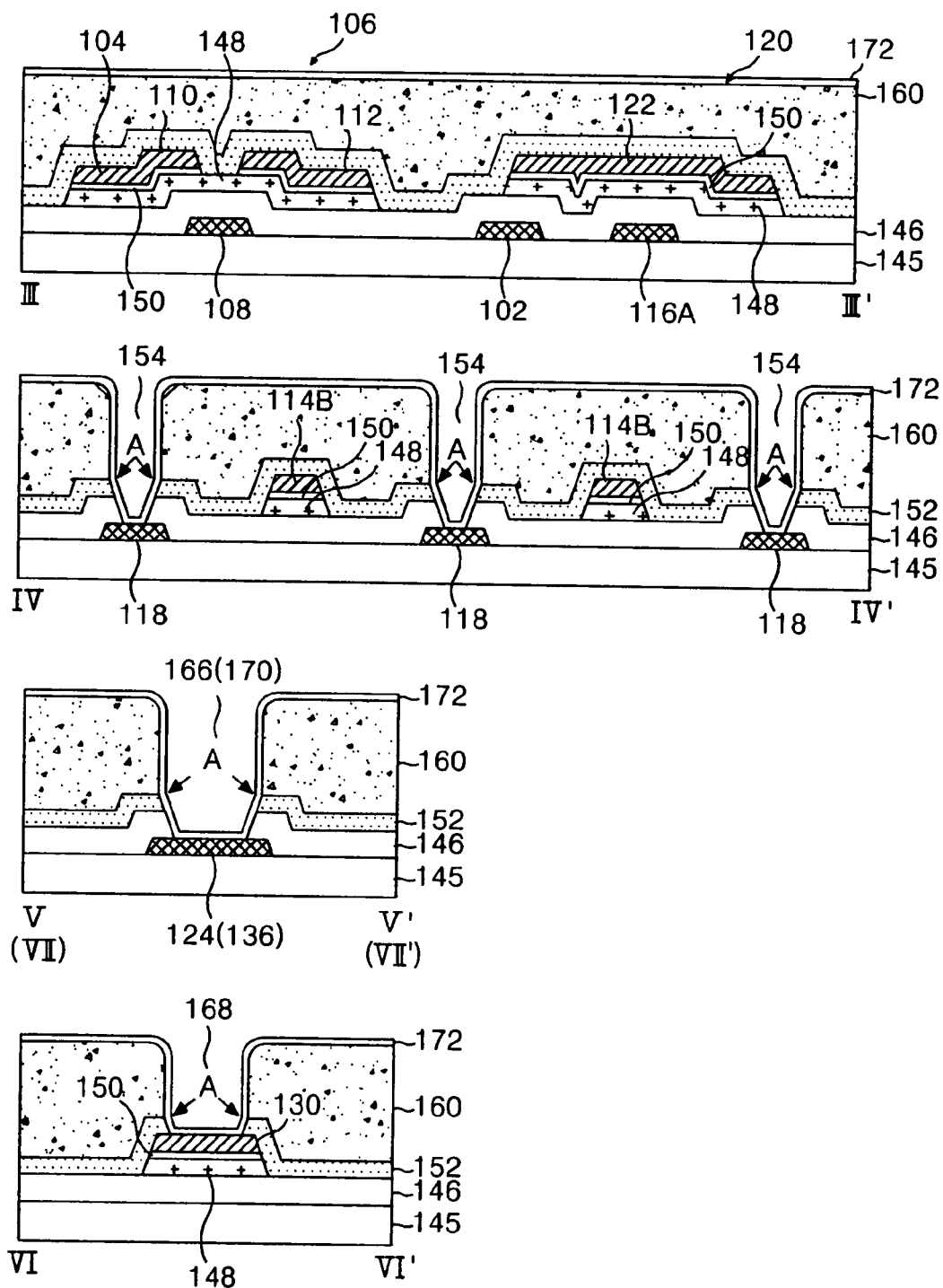

Subsequently, as shown in FIG. 10C, a third conductive layer 172 is entirely formed on the thin film transistor substrate, on which the photo-resist pattern 160 remains, by a deposition technique such as sputtering or the like. The third conductive layer 172 is formed of a transparent conductive layer including indium-tin-oxide (ITO), tin-oxide (TO), indium-zinc-oxide (IZO) or $SnO_2$, etc. Alternatively, the third conductive film 172 is formed of a metal material having a high corrosion-resistance and a high strength property, such as titanium (Ti) or tungsten (W), etc.

Figure 10D:
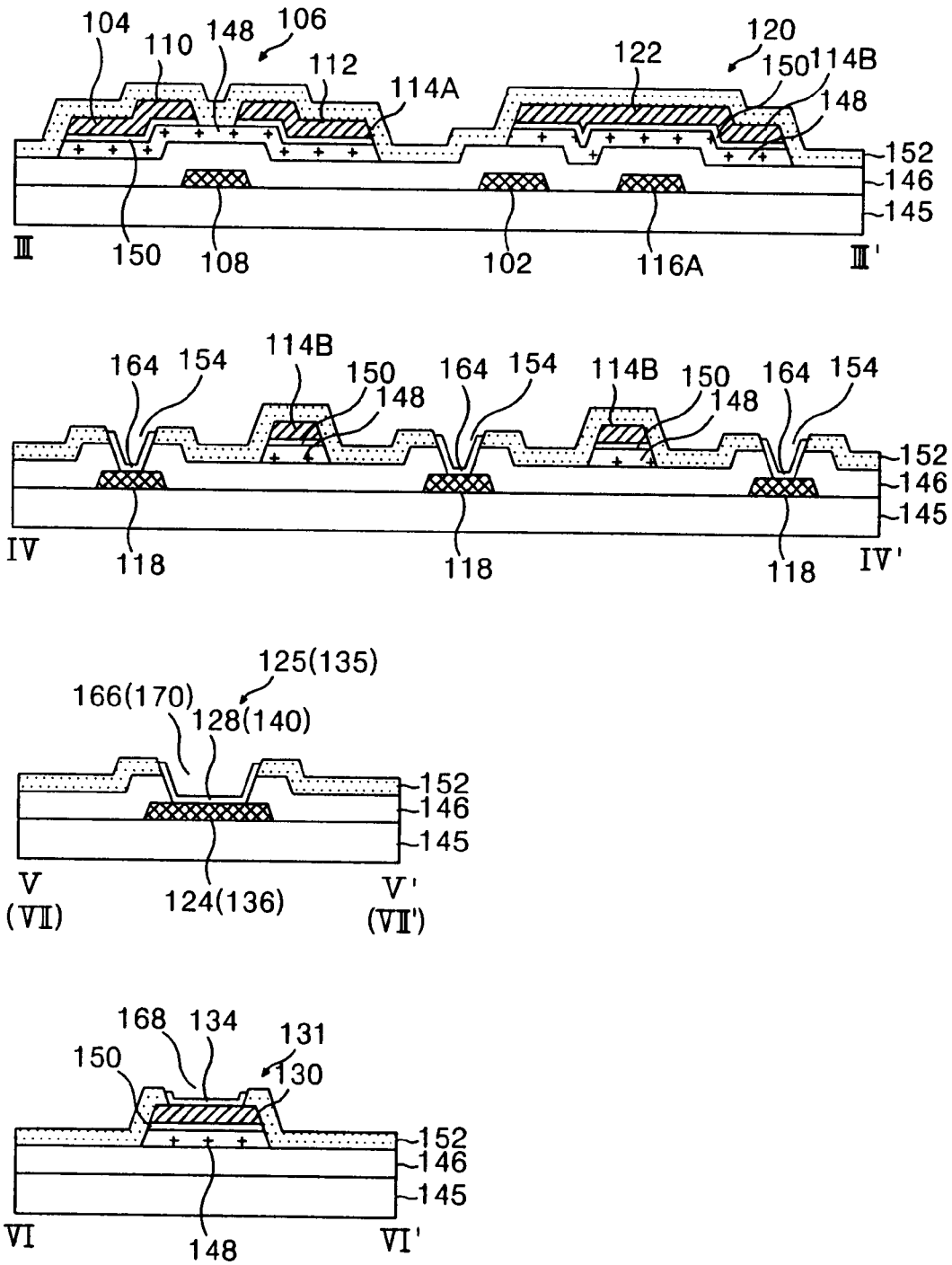

Then, the photo-resist pattern 160 is removed by a lift-off process, along with the third conductive layer 172 thereon, to thereby form the upper gate pad electrode 128, the upper common pad electrode 140, the upper data pad electrode 134 and the dummy transparent conductive pattern 164 in each of the first to third contact holes 166, 170 and 168 and the stripper penetration path 154, as shown in FIG. 10D.

In this case, the first to third contact holes 162, 166 and 170 and the stripper penetration path 154 are formed at a portion in which the photo-resist pattern 160 does not exist such that a greater amount of a stripper, for example, stripper A, can be infiltrated into the interface between the photo-resist pattern 160 and the protective film 152. As a result, the photo-resist pattern 160 covered with the third conductive layer 172 can be easily separated from the protective film 152 by the stripper A. This is because the edge of the photo-resist pattern 160 has more protrusions (not shown) than the edge of the protective film 152 at portions where the stripper penetration path 154 and the first to third contact holes 162, 166 and 170 are provided in the protective film 152 due to an over-etching of the protective film 152. Further, this is because the third conductive layer 172 deposited in a direction perpendicular to the substrate 145 between the edge of the photo-resist pattern 160 and the edge of the protective film 152 has openings, or is relatively thinly deposited due to the protruded edge of the photo-resist pattern 160, thereby allowing the stripper A to easily infiltrate the photo-resist pattern 160.

As described above, an unnecessary portion of the third conductive layer 172 and the photo-resist pattern 160 are removed by the lift-off process, so that the third conductive pattern group can make an interface with the protective film 152. More specifically, the upper gate pad electrode 128, the upper common pad electrode 140 and the upper data pad electrode 134 are provided within the corresponding contact holes 166, 170 and 168 to be connected to the lower gate pad electrode 124, the lower common pad electrode 136 and the lower data pad electrode 130, respectively. Further, the third dummy conductive pattern 164 left in the stripper penetration path 154 also makes an interface with the protective film 152 within the stripper penetration path 154.

Examples of a shape of the stripper penetration path 154 passing through the gate insulating film 146 and/or the protective film 152 on the common electrode 118 and/or the pixel electrode 114 will be described.

Figure 11A:
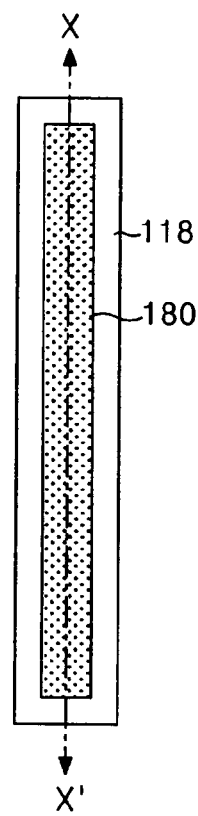
FIG. 11A and FIG. 11B are a plan view and a section view, respectively, illustrating an example of a stripper penetration path according to the embodiment of the present invention.
Figure 11B:
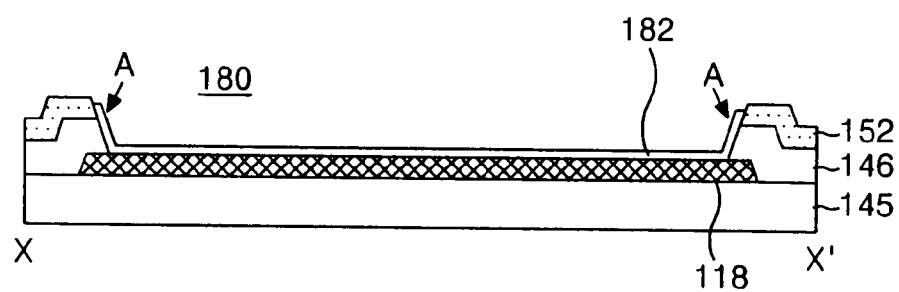

Referring to FIG. 11A and FIG. 11B, the stripper penetration path 154 is formed to have a shape of a slit 180 passing through the gate insulating film 146 and the protective film 152 on the common electrode 118. Further, the third dummy conductive pattern 182 remains in the slit 180. Such a slit 180 may be provided on any one of the signal lines including the gate line, the common line and the data line and the pixel electrode.

Figure 12A:
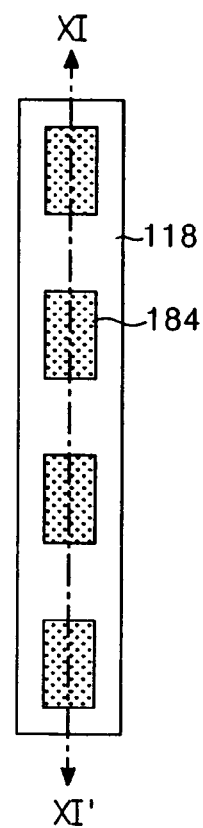
FIG. 12A and FIG. 12B are a plan view and a section view, respectively, illustrating another example of a stripper penetration path according to the embodiment of the present invention.
Figure 12B:
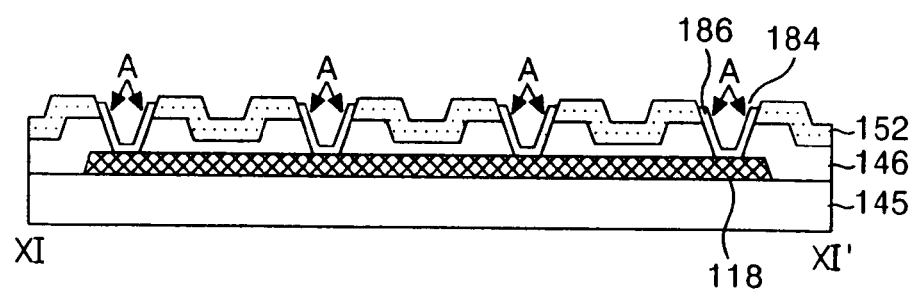

Referring to FIG. 12A and FIG. 12B, the stripper penetration path 154 is formed to have a plurality of holes 184 passing through the gate insulating film 146 and the protective film 152 on the common electrode 118. The third dummy conductive pattern 186 separated from each other remains within the plurality of holes 184. The plurality of holes 184 may be provided on any one of the signal lines including the gate line, the common line and the data line and the pixel electrode.

As described above, according to the present invention, a lift-off process is employed to eliminate the mask process of the third conductive layer. Accordingly, the thin film transistor substrate is fabricated by a three-mask process, so that the simplified fabrication process reduces the manufacturing cost and improves the production yield. Furthermore, according to the present invention, the stripper penetration path is provided on the signal lines in the protective film, so that the lift-off process for removing the photo-resist pattern covered with the third conductive layer can be effectively facilitated.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating an LCD of a horizontal electric field type having a liquid crystal between lower and upper substrates, comprising:

forming a first conductive pattern group including a gate line, a gate electrode connected to the gate line, a lower gate pad electrode, a common line, a common electrode extended from the common line, a lower common pad electrode connected to the common line on the lower substrate by patterning a first conductive layer;

forming a gate insulating film on the first conductive pattern group;

forming a semiconductor pattern on the gate insulating film;

forming a second conductive pattern group including a data line crossing the gate line to define a pixel area, a source electrode and a lower data pad electrode connected to the data line, a drain electrode opposed to the source electrode and a pixel electrode connected to the drain electrode on the semiconductor pattern by pattering a second conductive layer, the common electrode and the pixel electrode forming a horizontal electric field in the pixel area during an operation of the LCD;

forming a protective film on the second conductive pattern group;

forming first to third contact holes for exposing the lower gate pad electrode, the lower common pad electrode and the lower data pad electrode by patterning at least one of the protective film and the gate insulating film using a photo-resist pattern; and forming a third conductive pattern group including an upper gate pad electrode, an upper common pad electrode and an upper data pad electrode by depositing a third conductive layer on the photo-resist pattern and then by lifting-off the photo-resist pattern, the upper gate pad electrode, the upper common pad electrode and the upper data pad electrode connected to the lower gate pad electrode, the lower common pad electrode and the lower data pad electrode, respectively, via the first to third contact holes.

2. The method according to claim 1, further comprising:

forming a stripper penetration path hole on at least one of the gate line, the data line, the common line, and the common electrode in the pixel area, and at the same time.

3. The method according to claim 2, wherein the stripper penetration path hole facilitates the lifting off process of the photo-resist pattern.

4. The method according to claim 3, wherein the photo-resist pattern has protrusions in an interface with the protective film.

5. The method according to claim 2, wherein the stripper penetration path hole is formed to have a shape of a slit or a plurality of holes.

6. The method according to claim 1, further comprising:
forming an upper storage electrode overlapping a portion of the gate line and a portion of the common line adjacent to the gate line with the gate insulating film and the semiconductor pattern therebetween and electrically connected to the pixel electrode.

7. The method according to claim 2, wherein the stripper penetration path is formed in such a manner to go through until the gate insulating film under the protective film.

8. The method according to claim 2, wherein the stripper penetration path includes any at least one of a slit and a plurality of holes provided along any at least one of said plurality of signal lines and electrodes.

9. The method according to claim 2, wherein the stripper penetration path is provided on the common electrode.

10. The method according to claim 2, wherein said third conductive layer contains any one of a transparent conductive layer, titanium and tungsten.

11. A method of fabricating a thin film transistor substrate of horizontal electric field applying type, said method comprising:
a first mask process of forming a gate line, a gate electrode and a lower gate pad electrode connected to the gate line, a common line parallel to the gate line, a lower common pad electrode connected to the common line and a common electrode extended from the common line into a pixel area on a substrate from a first conductive layer;
a second mask process of entirely coating a gate insulating film, and forming a semiconductor pattern at a desired area of the gate insulating film and forming a data line crossing the gate line and the common line, a source electrode and a lower data pad electrode connected to the data line, a drain electrode opposed to the source electrode and a pixel electrode connected to the drain electrode to form a horizontal electric field along with the common electrode on said semiconductor pattern from a second conductive layer; and
a third mask process of entirely coating a protective film, patterning the protective film along with the gate insulating film to define first to fourth contact holes for exposing the lower gate pad electrode, the lower common pad electrode and a lower data pad electrode, and forming an upper gate pad electrode, an upper common pad electrode and an upper data pad electrode from a third conductive layer within the first to fourth contact holes,
wherein the third mask process further comprises:
providing a penetration path of a stripper going through the protective film on any at least one of a plurality of signal lines and electrodes formed from the first and second conductive layers in order to remove the photo-resist pattern.

12. The method according to claim 11, wherein said third mask process includes:
entirely coating the protective film;
forming a photo-resist pattern on the protective film using a mask;
patterning the protective film and the gate insulating film by the photo-resist pattern;
entirely coating a transparent conductive film onto the photo-resist pattern; and
removing the photo-resist pattern covered with the transparent conductive film to pattern the transparent conductive film.

13. The method according to claim 11, wherein the stripper penetration path is formed in such a manner to go through until the gate insulating film under the protective film.

14. The method according to claim 11, wherein the stripper penetration path includes any at least one of a slit and a plurality of holes provided along any at least one of said plurality of signal lines and electrodes.

15. The method according to claim 11, wherein the stripper penetration path is provided on the common electrode.

16. The method according to claim 15, wherein said third conductive layer making an interface with the patterned protective film is left within the stripper penetration path.

17. The method according to claim 16, wherein the first to third contact holes are used as the stripper penetration path.

18. The method according to claim 11, wherein said second mask process further comprises:
forming an upper storage electrode overlapping with a portion of the gate line and a portion of the common line adjacent to the gate line with having the gate insulating film and the semiconductor pattern therebetween and connected to the pixel electrode from said second conductive layer.

19. The method according to claim 11, wherein said third conductive layer contains any one of a transparent conductive layer, titanium and tungsten.

* * * * *